(12) United States Patent
Oguchi et al.

(10) Patent No.: US 9,297,722 B2
(45) Date of Patent: Mar. 29, 2016

(54) DRIVER'S AID DEVICE AND DRIVER'S AID SYSTEM

(75) Inventors: Narumi Oguchi, Yokohama (JP);
Yasumasa Narumi, Koshigaya (JP);
Youichi Tohyama, Chofu (JP); Akihiro Ishiduka, Machida (JP); Noboru Shiozawa, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 286 days.

(21) Appl. No.: 13/386,126

(22) PCT Filed: Jul. 16, 2010

(86) PCT No.: PCT/JP2010/062097
§ 371 (c)(1),
(2), (4) Date: Jan. 20, 2012

(87) PCT Pub. No.: WO2011/010617
PCT Pub. Date: Jan. 27, 2011

(65) Prior Publication Data
US 2012/0242513 A1    Sep. 27, 2012

(30) Foreign Application Priority Data

Jul. 22, 2009   (JP) .................. 2009-171575
Nov. 30, 2009   (JP) .................. 2009-271497

(51) Int. Cl.
*G08G 1/123*    (2006.01)
*G01M 17/007*   (2006.01)

(52) U.S. Cl.
CPC .................. *G01M 17/0074* (2013.01)

(58) Field of Classification Search
None
See application file for complete search history.

(56) References Cited

U.S. PATENT DOCUMENTS

2002/0018982 A1    2/2002  Conroy
2003/0088354 A1*   5/2003  Persson et al. ............... 701/93
(Continued)

FOREIGN PATENT DOCUMENTS

JP    61-255380 A    11/1986
JP    63-215936 A    9/1988
(Continued)

OTHER PUBLICATIONS

Chinese Office Action, Dec. 31, 2013, 13 pages.
(Continued)

*Primary Examiner* — Ojiako Nwugo
(74) *Attorney, Agent, or Firm* — Foley & Lardner LLP

(57) ABSTRACT

[Object] Object of the present invention is to improve accuracy of the travelling test of a tested vehicle on a chassis dynamometer, and to increase realistic feeling of the travelling test.
[Means to solve] A driver's aid device 5 displays, on a main screen 11, a travelling speed pattern 12 that is a driving pattern for performing a performance evaluation test of a tested vehicle 6. The main screen 11 displays thereon topographical feature information 13 of a road where the travelling test is carried out. A marker 14 that indicates a vehicle state is shown at an intersection of the topographical feature information 13 and a reference line 15 that indicates a present position of the tested vehicle 6. This marker 14 is shown with the marker 14 inclined in accordance with a gradient of the road where the test is carried out. Further, a curve band 28 indicating curve information of the road where the travelling test is carried out is shown on the main screen 11. The curve band 28 is shown with a color of the curve band 28 changed in accordance with an angle of the curve. In addition, the travelling speed pattern 12 is created on the basis of data of GPS or a map data 10. Furthermore, a travelling route where the travelling test is carried out is displayed on an auxiliary display device on the basis of data to create the travelling speed pattern.

20 Claims, 16 Drawing Sheets

(56) References Cited

U.S. PATENT DOCUMENTS

| | | | |
|---|---|---|---|
| 2003/0139909 A1* | 7/2003 | Ozawa | 702/183 |
| 2004/0183700 A1* | 9/2004 | Morie | G01C 21/3673 340/995.1 |
| 2006/0020387 A1* | 1/2006 | Nagata et al. | 701/207 |
| 2007/0067103 A1* | 3/2007 | Fukumoto et al. | 701/211 |
| 2007/0118282 A1* | 5/2007 | Yamamoto | B60T 7/22 701/1 |
| 2008/0055192 A1* | 3/2008 | Nagano et al. | 345/7 |
| 2008/0082254 A1* | 4/2008 | Huhtala et al. | 701/201 |
| 2009/0216440 A1* | 8/2009 | Funato | 701/210 |
| 2010/0057358 A1* | 3/2010 | Winer et al. | 701/210 |
| 2010/0251832 A1* | 10/2010 | Kirkpatrick | 73/862.191 |
| 2011/0288770 A1* | 11/2011 | Greasby | 701/208 |
| 2012/0229376 A1* | 9/2012 | Matsumoto et al. | 345/156 |

FOREIGN PATENT DOCUMENTS

| | | |
|---|---|---|
| JP | 2-32034 U | 2/1990 |
| JP | 6-46351 U | 6/1994 |
| JP | 6-80153 U | 11/1994 |
| JP | 8-170938 A | 7/1996 |
| JP | 8-261771 A | 10/1996 |
| JP | 8-304237 A | 11/1996 |
| JP | 11-37902 A | 2/1999 |
| JP | 11-153519 A | 6/1999 |
| JP | 11-160203 A | 6/1999 |
| JP | 11-160204 A | 6/1999 |
| JP | 2001-108580 A | 4/2001 |
| JP | 2008-137652 A | 6/2008 |

OTHER PUBLICATIONS

Japanese Office Action, Feb. 18, 2014, 2 pages.

* cited by examiner

FIG.3
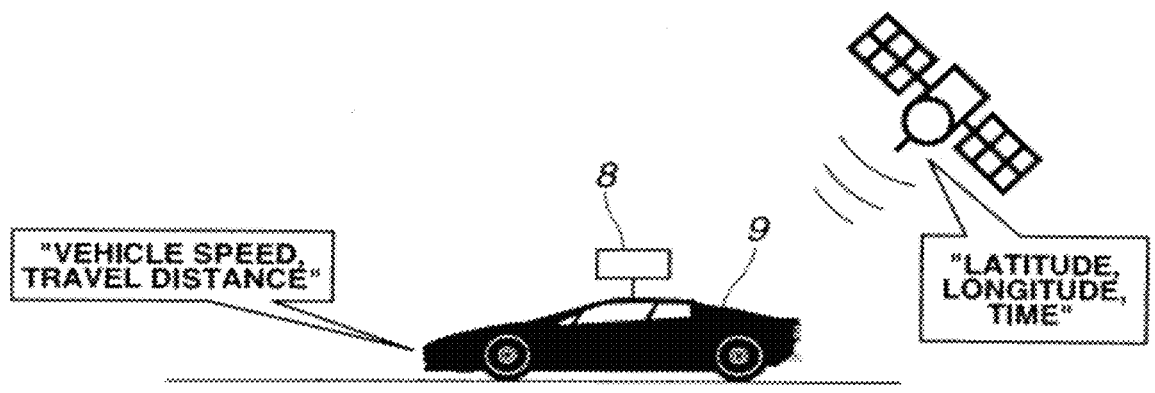
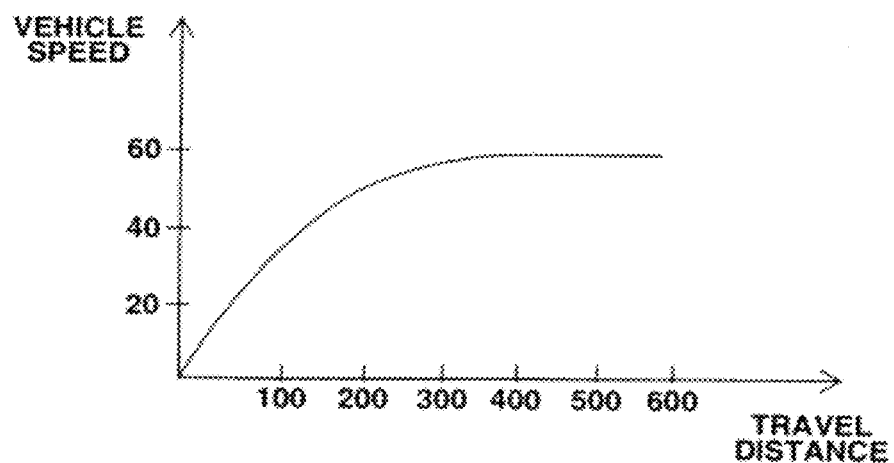

FIG.6
(a)
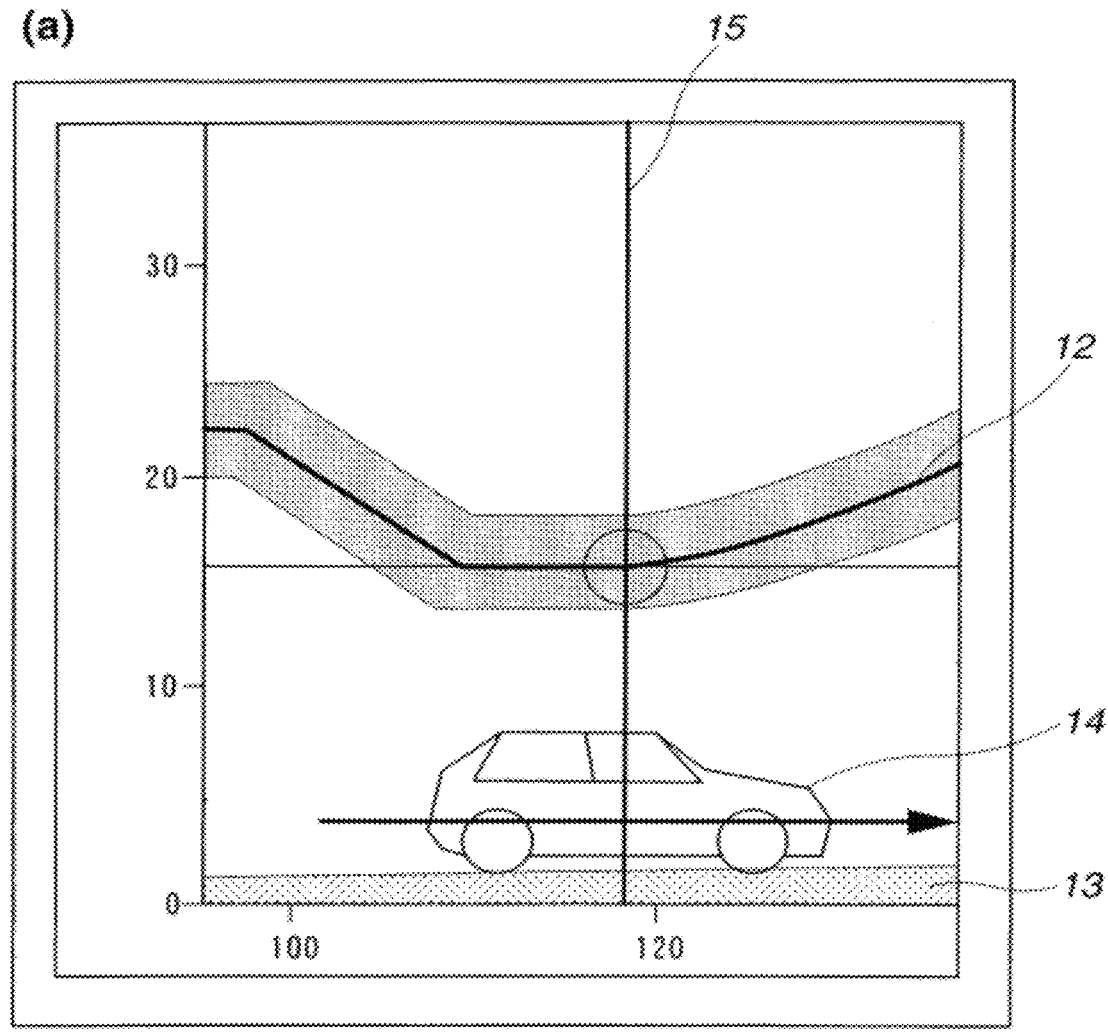
(b)
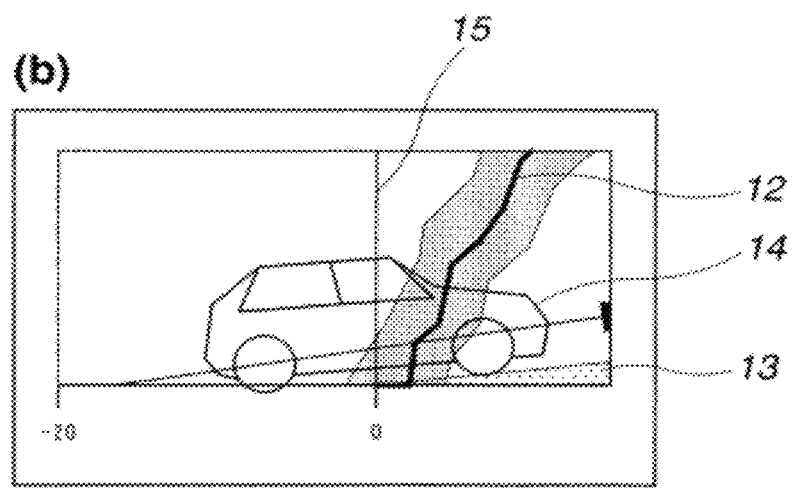

DRIVER'S AID DEVICE AND DRIVER'S AID SYSTEM

TECHNICAL FIELD

The present invention relates to driver's aid device and system which are used in a performance evaluation test of a vehicle tested on a chassis dynamometer and aid or assist a driver of the vehicle in driving while following a travelling speed pattern.

BACKGROUND ART

The chassis dynamometer used in the performance evaluation test of the vehicle is widely used for a fuel consumption measurement test, an exhaust gas characteristic test, an endurance test and so on, because the test that corresponds to a travel of the vehicle on an actual road can be carried out easily indoors with good repeatability. In the vehicle travelling test by this chassis dynamometer, in order for the driver to drive with the repeatability, a driving pattern (the travelling speed pattern) by which a drive operation by the driver is done for the performance evaluation of the vehicle is displayed on a monitor (a driver's aid display).

Driver's aid is the one that indicates or displays at what speed the driver should drive the tested vehicle. As an example of the travelling speed pattern indicated by the driver's aid, it is a driving pattern such as "10·15 mode" and "US06 mode" (see, for instance, Patent Documents 1 and 2). The performance evaluation test is carried out by the fact that the driver drives the tested vehicle on the chassis dynamometer so as to follow this travelling speed pattern.

When the driver drives the tested vehicle while following the travelling speed pattern, the driver of the tested vehicle is required to drive so that mainly a speed of the tested vehicle corresponds to the travelling speed pattern all the time. Therefore, in order that the driver of the tested vehicle can check other information (e.g. a throttle opening, a gradient of the road surface, and the like) while checking the travelling speed pattern information and the actual speed of the tested vehicle, information that is necessary for the performance evaluation test of the vehicle is displayed on the driver's aid display (see, for instance, Patent Documents 1~5).

Currently, a performance evaluation manner of the vehicle diversifies, and not only the above exhaust gas test is required, but also it is required that a travelling test on the actual road that is not normalized should be replicated on the chassis dynamometer. In a case where the travelling test on the actual road is replicated, the vehicle actually travels on the road where the travelling test is carried out, thereby collecting road data (see, for instance, Patent Documents 6 and 7), then the travelling speed pattern is created on the basis of the collected data and is displayed on the driver's aid display. The collection of the road data is made a plurality of times, and by averaging them, the accuracy of the travelling speed pattern is improved.

CITATION LIST

Patent Document

Patent Document 1: Japanese Patent Application Publication No. JP8-170938
Patent Document 2: Japanese Patent Application Publication No. JP11-160203
Patent Document 3: Japanese Patent Application Publication No. JP11-37902
Patent Document 4: Japanese Patent Application Publication No. JP11-153519
Patent Document 5: Japanese Patent Application Publication No. JP11-160204
Patent Document 6: Japanese Patent Application Publication No. JP63-215936
Patent Document 7: Japanese Patent Application Publication No. JP8-304237
Patent Document 8: Japanese Patent Application Publication No. JP61-255380

SUMMARY OF THE INVENTION

Technical Problem

However, even if a speed command is same, an accelerator operation of the driver is different depending on a road condition (the gradient, a curve, etc.). Thus, it is required to inform the driver of the road condition in an easy-to-understand manner (in an easy-to-recognize manner) even while the driver of the tested vehicle is watching and checking the travelling speed pattern.

Even though there exists a driver's aid system that displays the travelling speed pattern and the gradient information (for instance, Patent Document 1) in related art driver's aid systems, because the driver of the tested vehicle is required to drive so as to follow the travelling speed pattern, the driver must drive while checking especially the travelling speed pattern.

That is, even in the case of the driver's aid system in which the travelling speed pattern and the gradient information etc. are displayed on a same screen, if a location where the travelling speed pattern is shown and a location where the gradient information is shown are different on the same screen, it is hard to recognize the gradient information (or the curve information etc.) while checking the travelling speed pattern. Therefore, a displaying manner in which the driver of the tested vehicle can easily recognize the gradient information (or the curve information etc.) even while paying attention to the travelling speed pattern is required.

In addition, as a gathering manner of travelling data when performing the travelling performance test on the actual road that is not normalized, the vehicle travels on the road where the performance test is actually performed a plurality of times, thereby gathering the travelling data on the basis of the gathered travelling data. This work for collecting the data a plurality of times by actually travelling on the road where the performance test is performed requires time and manpower. Further, if the road where the performance test is performed is changed, there is a need to collect the data again. Furthermore, in a case where an environmental test is carried out on a road in cold district or in highland, it takes considerable time and effort to actually travel on the road. Moreover, in the case of the conventional manner that collects the data, a plurality of times, of the road where the performance test is performed and averages them, it is difficult to improve the accuracy of the travelling speed pattern. The reason why it is difficult is because even if the vehicle travels on the same road, it is difficult to get the data that allows the repeatability due to traffic jam, weather condition and so on.

It is therefore an object of the present invention to provide a driver's aid device that shows required information on the driver's aid display in an easy-to-understand manner so that the driver of the tested vehicle can drive while following the travelling speed pattern, and a driver's aid device that contributes to creation of a high accuracy travelling test pattern.

Further, since the travelling speed pattern is provided with the aim of assisting the driver in driving while following the travelling speed pattern, topographical feature information of the actual road where the travelling test is carried out and a progress state of the travelling test are not visually displayed on a related art driver's aid display.

It is thus the other object of the present invention to provide a driver's aid system that provides realistic feeling to not only the driver but also a third person other than the driver (e.g. a test examiner or a visitor of a test system other than the driver) so that they feel, from the travelling speed pattern displayed on the driver's aid display, as if the travelling test on the actual road is being carried out.

Solution to Problem

A driver's aid device of the present invention to achieve the above object, having a first controlling means that displays, on a first displaying means, a travelling speed pattern that is a driving pattern for performing a performance evaluation test of a tested vehicle by a chassis dynamometer, is characterized in that the first controlling means shows, in an area of the first displaying means where the travelling speed pattern is displayed, a marker that indicates inclination of the vehicle with the marker inclined in accordance with gradient information of a road corresponding to the travelling speed pattern.

Further, a driver's aid device of the present invention to achieve the above object, having a first controlling means that displays, on a first displaying means, a travelling speed pattern that is a driving pattern for performing a performance evaluation test of a tested vehicle by a chassis dynamometer, is characterized in that the first controlling means displays, in an area of the first displaying means where the travelling speed pattern is displayed, curve information of a road corresponding to the travelling speed pattern, and changes a color of the displayed curve information in accordance with an angle of a curve.

In addition, a driver's aid device of the present invention to achieve the above object, having a first controlling means that displays, on a first displaying means, a travelling speed pattern that is a driving pattern for performing a performance evaluation test of a tested vehicle by a chassis dynamometer, is characterized in that the first controlling means displays, in an area of the first displaying means where the travelling speed pattern is displayed, topographical feature information based on a height of a road corresponding to the travelling speed pattern.

Furthermore, a driver's aid device of the present invention to achieve the above object, having a first controlling means that displays, on a first displaying means, a travelling speed pattern that is a driving pattern for performing a performance evaluation test of a tested vehicle by a chassis dynamometer, is characterized in that the driver's aid device is provided with a travelling speed pattern creating means that creates the travelling speed pattern on the basis of a travelling data obtained by actually travelling on a road corresponding to the travelling speed pattern by a vehicle equipped with a GPS.

Moreover, a driver's aid device of the present invention to achieve the above object, having a first controlling means that displays, on a first displaying means, a travelling speed pattern that is a driving pattern for performing a performance evaluation test of a tested vehicle by a chassis dynamometer, is characterized in that the driver's aid device is provided with a travelling speed pattern creating means that creates the travelling speed pattern on the basis of a map data having information for calculating a distance and a gradient of a road corresponding to the travelling speed pattern.

Additionally, a driver's aid system of the present invention to achieve the above object, showing a travelling speed pattern which a driver of a tested vehicle follows during drive, to perform a performance evaluation test of the tested vehicle on a chassis dynamometer, is characterized in that the driver's aid system has a first controlling means that displays the travelling speed pattern on a first displaying means and a second controlling means that displays a travelling route corresponding to the travelling speed pattern on a second displaying means.

In the above driver's aid system, it is preferable that the second controlling means display a travelling route to which altitude information is added. The second controlling means could display the travelling route and a map data with these travelling route and map data overlaid. It is also preferable that the second controlling means have a correcting means that corrects displayed positions of the travelling route and the map data.

Further, in the above driver's aid system, it is preferable that the travelling speed pattern be created on the basis of a travelling data obtained by travelling on a road corresponding to the travelling speed pattern by a vehicle equipped with a GPS.

In addition, in the above driver's aid system, it is preferable that the second controlling means show, on the basis of a command value of the travelling speed pattern, a marker that indicates a present position of the tested vehicle on the travelling route. This second controlling means could display the travelling route with a color of a route, where a travelling test is completed, changed. Also the second controlling means could display, on the second displaying means, an image of a vehicle-mounted camera mounted on the vehicle equipped with the GPS.

Effects of the Invention

According to the present invention, the driver's aid device contributes to improvement in accuracy of the performance evaluation of the vehicle by the chassis dynamometer. In addition, the driver's aid system contributes to visually accurately recognizing or grasping geographical information of the route through which the travelling test is carried out and the progress state of the travelling test (contributes to getting the realistic feeling).

BRIEF DESCRIPTION OF THE DRAWINGS

FIG. 3 is a schematic diagram showing a creating manner of a travelling speed pattern.

FIG. 6 is an enlarged view of a marker display part, of the example of the screen controlled by the driver's aid device according to the first embodiment of the present invention.

EMBODIMENTS FOR CARRYING OUT THE INVENTION

Embodiment 1

A chassis dynamometer provided with a driver's aid device of an embodiment 1 of the present invention will be explained below with reference to FIGS. 1-7.

Figure 1:
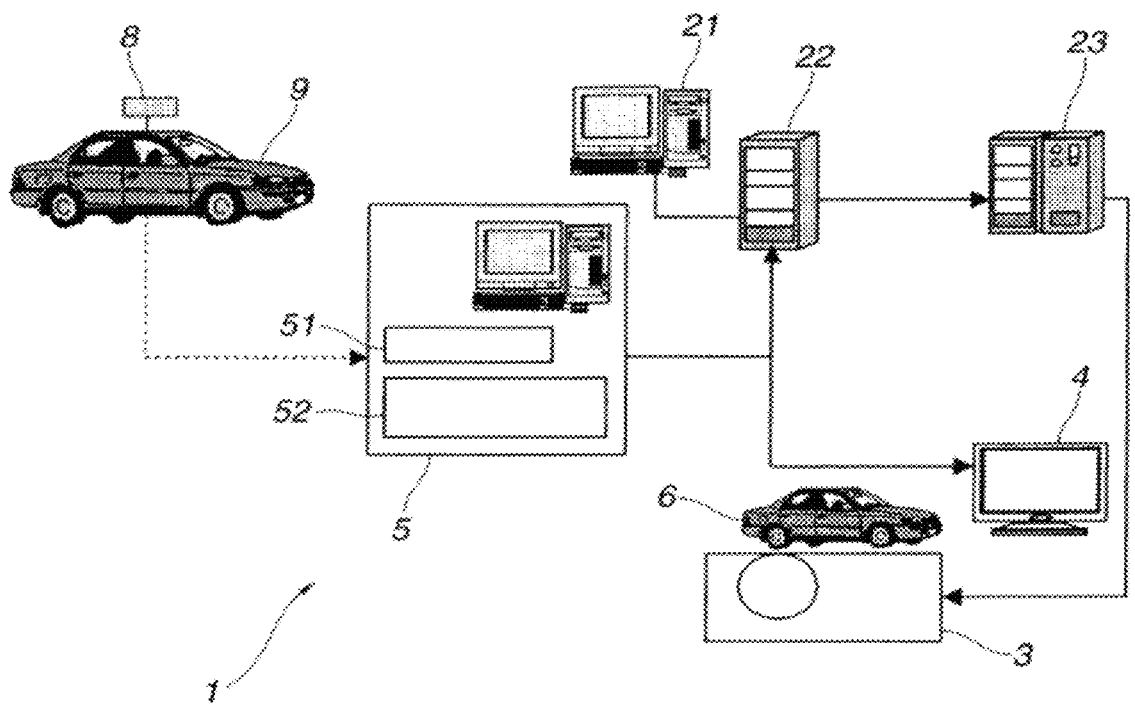
FIG. 1 is a system block diagram of a chassis dynamometer provided with a driver's aid device according to a first embodiment of the present invention.

As shown in FIG. 1, a chassis dynamo 1 of the embodiment 1 of the present invention has a chassis dynamometer 3 on which driving wheels of a tested vehicle 6 are put, a driver's aid device 5 and a driver's aid display device 4.

The chassis dynamometer 3 is controlled by an operation measurement board 22 through a dynamo control board 23. A control computer system 21 is a man-machine interface and executes a manual operation, a correction etc. of the operation measurement board 22. Here, the operation measurement board 22 inputs test schedule information (speed information, gradient information) from the driver's aid device 5 and information (a vehicle speed etc. of the tested vehicle 6) detected by the chassis dynamometer 3.

The driver's aid device 5 has a travelling speed pattern creating section or means 52 and a controlling section or means 51.

Figure 2:
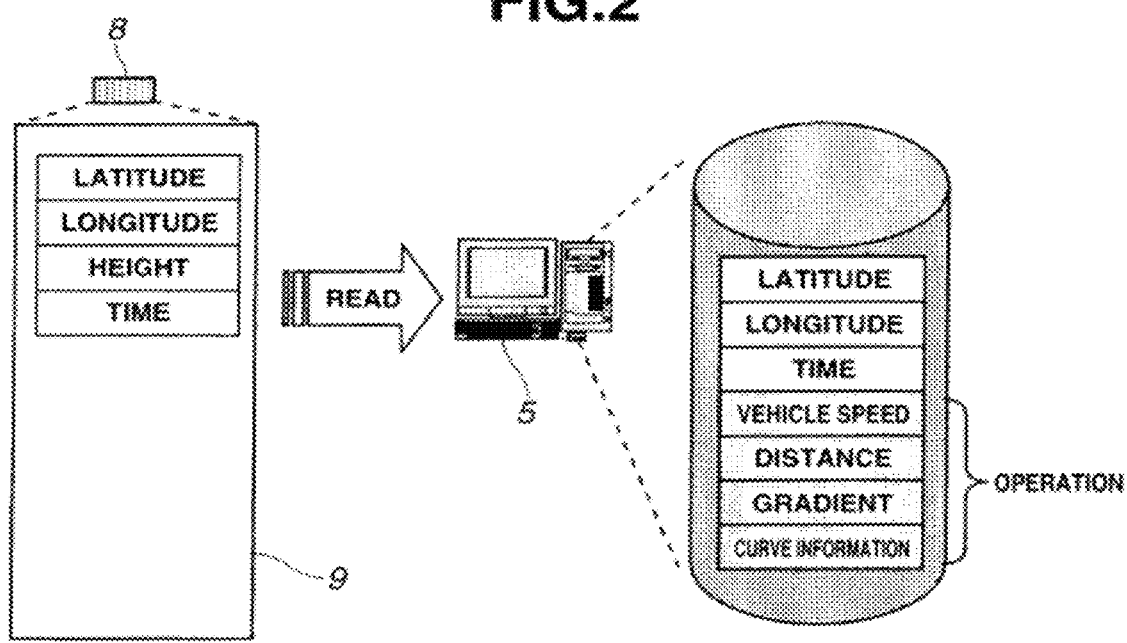
FIG. 2 is a schematic diagram showing input and output data of the driver's aid device according to the first embodiment of the present invention.

The travelling speed pattern creating section 52 inputs data of a vehicle 9 that actually travelled on a road where a travelling test is carried out. The travelling speed pattern creating section 52 then creates a travelling speed pattern on the basis of this data. When the vehicle 9 equipped with a GPS (Global Positioning System) receiver 8 as shown in FIG. 1 travels on the road where the travelling test is carried out and obtains a travelling data, as shown in FIG. 2, the travelling speed pattern creating section 52 inputs information (e.g. a latitude, a longitude, an altitude (or a height) and time) received by the GPS receiver 8. Therefore, the travelling speed pattern can be created using the collected data obtained by the fact that the vehicle 9 actually travels on the road where the travelling test is carried out and the information received by the GPS receiver 8. Further, it is possible to correct the travelling speed pattern on the basis of the information received by the GPS receiver 8, then a more accurate travelling speed test can be carried out.

For example, as shown in FIG. 3, since a position of the vehicle 9 and speed information at this position can be obtained from only the information obtained by the GPS receiver 8, a travel distance of the vehicle 9 on the road where the travelling test is carried out can be determined by only the information received by the GPS receiver 8. It is therefore possible to easily create a travelling speed pattern whose horizontal axis is the travel distance or a travelling speed pattern whose horizontal axis is time.

The controlling section 51 shows the travelling speed pattern created by the travelling speed pattern creating section 52 on the driver's aid display device 4. In addition, the controlling section 51 shows, on the driver's aid display device 4, information (gradient information, curve information, etc.) that is necessary for the driver of the tested vehicle 6 to drive the tested vehicle 6 while following the travelling speed pattern.

Functions of these controlling section 51 and travelling speed pattern creating section 52 can be realized by a computer and a program. The program is stored in a known storage medium or could be provided through a network (those of an embodiment 2 are the same as the embodiment 1).

The driver's aid display device 4 is a CRT display etc., and displays thereon the travelling speed pattern outputted from the driver's aid device 5. The driver of the tested vehicle 6 drives the tested vehicle 6 on the chassis dynamometer 3 while checking this travelling speed pattern so as to follow this travelling speed pattern.

FIGS. 4~7 show examples of the display of the driver's aid display device 4. A main screen 11 of the driver's aid display device 4 displays thereon a travelling speed pattern 12. The driver of the tested vehicle 6 drives so that the vehicle speed of the tested vehicle 6 follows this travelling speed pattern 12. Further, the driver's aid display device 4 could show a sub screen 11a that displays an entire travel where the travelling test is carried out, and could show analog speed information 17, analog gradient information 18, a drive time 19 of the tested vehicle 6, a travel distance 20 of the tested vehicle 6, etc. Here, with regard to the analog speed information 17, a current vehicle speed and a target vehicle speed could be displayed.

Figure 4:
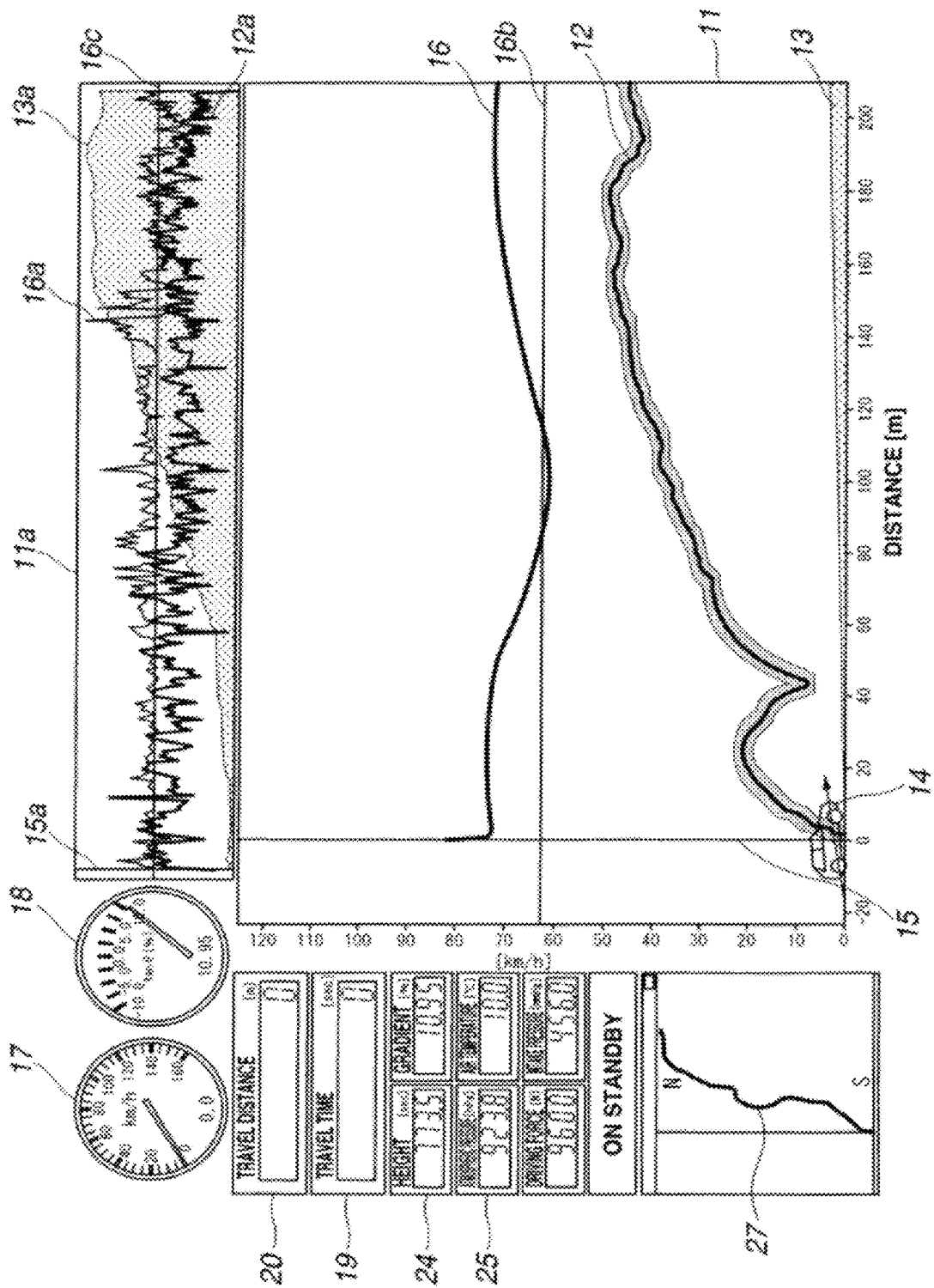
FIG. 4 is a drawing showing an example of a screen controlled by the driver's aid device according to the first embodiment of the present invention.

As shown in FIG. 4, besides the travelling speed pattern 12, the main screen 11 of the driver's aid display device 4 could display topographical feature information 13 and gradient information 16. Furthermore, a reference line (or a base line) 15 as a line that indicates a present position of the tested vehicle 6 is shown on the main screen 11. The topographical feature information 13 indicates information about the altitude (or the height) of the road where the travelling test is carried out. The topographical feature information 13 is shown on the basis of, for example, altitude information obtained by the GPS. The gradient information 16 indicates information about a gradient (an angle) of the road where the travelling test is carried out. When the gradient information 16 is shown at an upper side with respect to a gradient 0 reference line 16b, this means an upgrade. When the gradient information 16 is shown at a lower side with respect to the gradient 0 reference line 16b, this means a downgrade.

Figure 5:
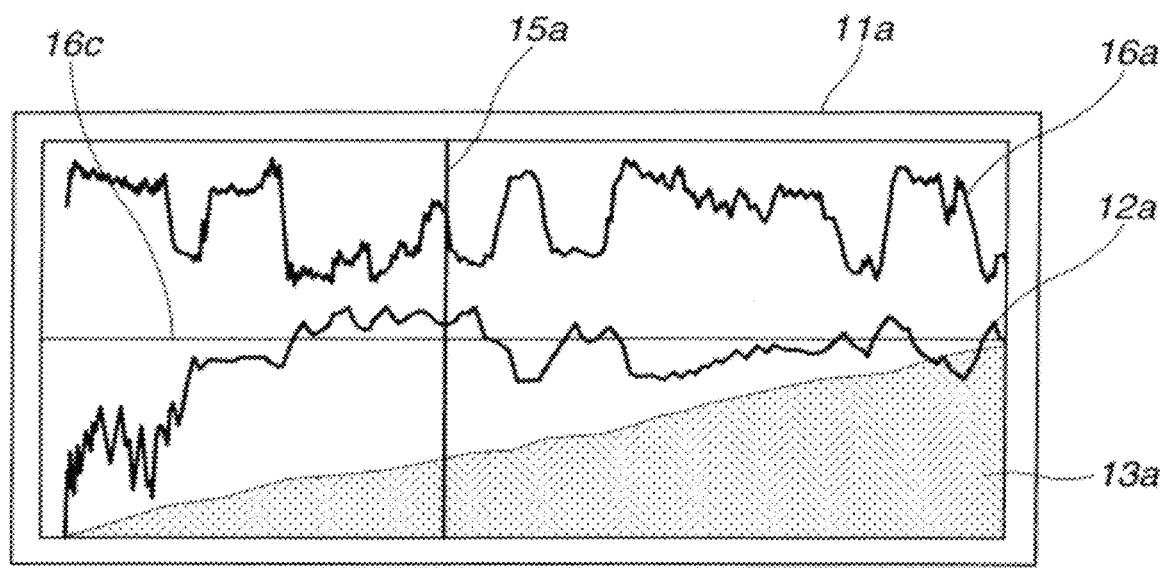
FIG. 5 is an enlarged view of a sub screen display part, of the example of the screen controlled by the driver's aid device according to the first embodiment of the present invention.

FIG. 5 is an enlarged view of the sub screen 11a. An entire travel travelling speed pattern 12a, an entire travel topographical feature information 13a, an entire travel gradient information 16a, a gradient 0 reference line 16c, a reference line (or a base line) 15a indicating a place where the tested vehicle 6 is currently located, and so on, of the travelling speed test are shown on the sub screen 11a.

In this embodiment, as shown in FIG. 4, a vertical axis of the travelling speed pattern 12 shown on the main screen 11 indicates the vehicle speed, and a horizontal axis indicates the travel distance. In a case of an exhaust gas drive mode such as the US06 mode, the horizontal axis of the travelling speed pattern 12 is time. That is, when performing the speed test that conforms to the standards, it is required that the drive of the tested vehicle 6 should be done in conformance with a speed command that keeps the vehicle speed for a certain time or a speed command that changes the vehicle speed during a certain time. Thus, when performing the travelling test, even if the vehicle speed changes, a scroll speed of the screen is constant, therefore the driver of the tested vehicle 6 can not get or comprehend a realistic drive condition.

On the other hand, when performing a test in which the vehicle virtually travels on the actual road with the horizontal axis of the travelling speed pattern being the distance, since the scroll speed of the screen changes according to the vehicle speed, the realistic travel condition can be replicated for the driver of the tested vehicle 6. Further, by setting the horizontal axis of the travelling speed pattern 12 as the travel distance, it is possible to inform the driver of the tested vehicle 6 of information concerning a route where the travelling test is carried out and information concerning a travel distance of the route where the travelling test is already carried out. In addition, since an actual road travelling data that is data to create the travelling speed pattern 12 is data of vehicle speed-distance, by setting the horizontal axis as the travel distance, the actual road travelling data can be used as it is, which is an advantage. Consequently, an operation that converts the data from the vehicle speed-distance to vehicle speed-time which is performed upon the creation of the travelling speed pattern 12 can be eliminated. Here, when a displaying manner, such as a conventional manner, in which the horizontal axis of the travelling speed pattern is set as the time and a displaying manner in which the horizontal axis of the travelling speed pattern is set as the distance that is a distance traveled by the tested vehicle 6 are changeably set, the driver of the tested vehicle 6 can select the displaying manner which facilitates the drive and is more suitable for the driver to drive.

As described above, in the case where the horizontal axis of the travelling speed pattern 12 is set as the distance traveled by the tested vehicle 6, a speed at which the travelling speed pattern 12 proceeds changes according to the speed of the tested vehicle 6. Thus, when the reference line 15 is shown while being moved on the screen, the driver of the tested vehicle 6 can easily get or grasp the travel condition.

The reference line 15 could be shown with the reference line 15 fixed on the main screen 11, or could be movably shown on the main screen 11. In a conventional manner, the screen on which the travelling speed pattern 12 is displayed is scrolled with the reference line 15 fixed, then the travelling speed test is carried out. However, as the displaying manner, it could be possible to fix an area in which the travelling speed pattern 12 is displayed while moving the reference line 15. In this case, the screen changes before the reference line 15 reaches a right end of the screen, then a state in which the reference line 15 shifts to a left end of the screen is displayed.

In the example shown in FIG. 4, a marker 14 that indicates a vehicle state is shown at an intersection of the reference line 15 and the topographical feature information 13 on the main screen 11. As the marker 14, it could be a marker that is able to be recognized as the vehicle such as a silhouette of the vehicle and a drawing of the vehicle, and could be an arrow that indicates the vehicle state. This marker 14 could be shown at an intersection of the reference line 15 indicating the position of the tested vehicle 6 and the travelling speed pattern 12, at the intersection of the reference line 15 and the topographical feature information 13, or on the reference line 15 along a gradient of the topographical feature information 13, in the area showing the travelling speed pattern.

FIGS. 6(a) and 6(b) are examples of an enlarged view of a marker 14 display area of the main screen 11. As shown in FIG. 6(a), the marker 14 is shown at the present position of the tested vehicle 6 on the topographical feature information 13. Thus, the driver of the tested vehicle 6 can recognize and check the marker 14 easily while watching and checking the travelling speed pattern 12. Here, the marker 14 could be shown at the present position of the tested vehicle 6 on the travelling speed pattern 12, namely at the intersection of the reference line 15 and the travelling speed pattern 12.

As shown in FIG. 6(b), when the marker 14 is shown with the marker 14 inclined in accordance with the gradient of the road where the test is carried out, the driver of the tested vehicle 6 can grasp the gradient information by the inclination of the marker 14 while watching and checking the travelling speed pattern 12 displayed on the main screen 11. At this time, if the road is shown with a color of the road changed depending on an uphill and a downhill, or if the road is shown with shades or tones of the road color changed depending on the angle of the gradient of the road, it is possible to inform the driver of the tested vehicle 6 of the more precise information. For instance, it is preferable that the uphill be shown in red color and the downhill be shown in blue color. Further, it is also preferable that the tones of the road color be changed so that, the greater the angle of the gradient of the road, the darker the color intensity of the red and the blue. However, the displaying manner is not limited to this. Appropriate colors, which are easy-to-understand colors, could be set. In addition, if the marker 14 is shown in translucent (semitransparent) color, this does not interfere with the drive by the driver of the tested vehicle 6 while following the travelling speed pattern 12.

Figure 7:
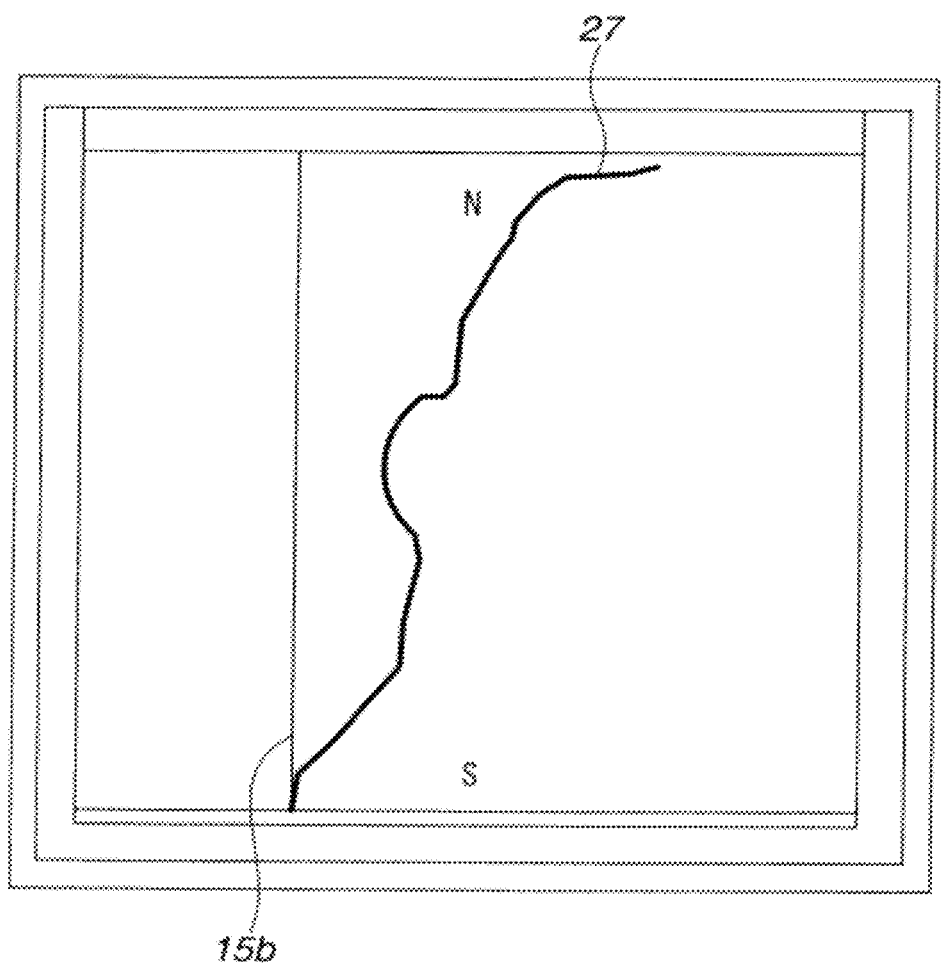
FIG. 7 is an enlarged view of a travelling route display part, of the example of the screen controlled by the driver's aid device according to the first embodiment of the present invention.
Figure 8:
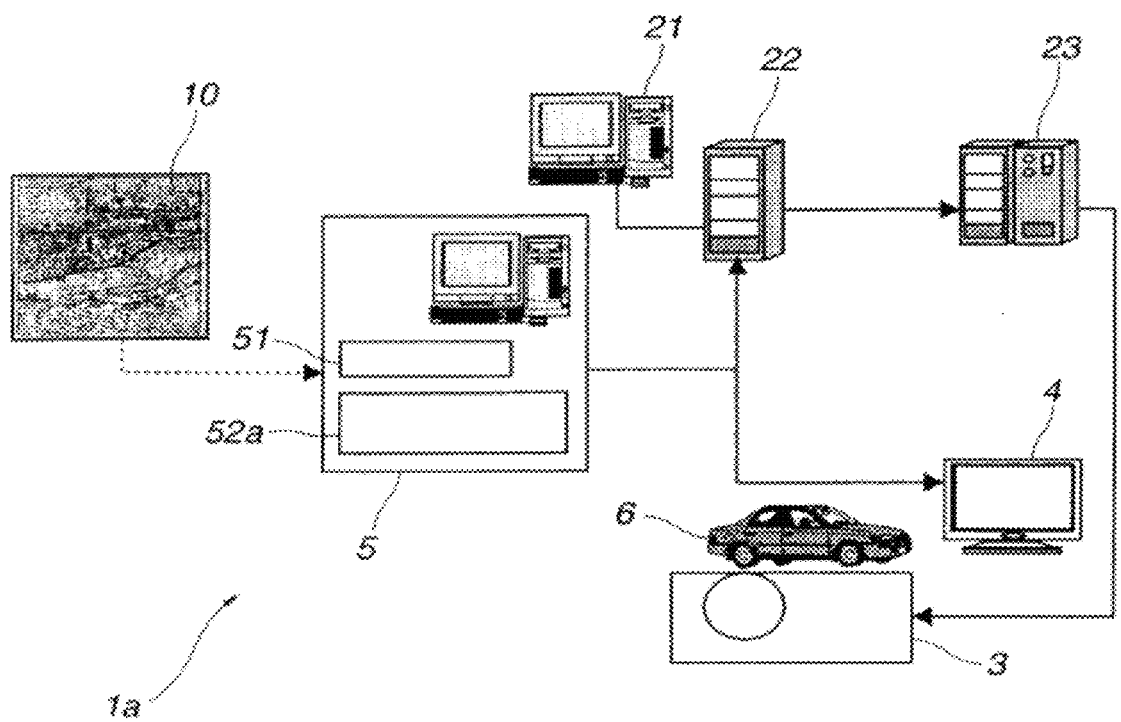
FIG. 8 is a system block diagram of a chassis dynamometer provided with a driver's aid device according to a second embodiment of the present invention.

FIG. 7 is an enlarged view of a display area, shown in the example of display of FIG. 4, showing a travelling route 27 that is plane travelling tracks of the road where the travelling test is carried out. By showing the travelling route 27 of the road where the travelling test is carried out, the driver of the tested vehicle 6 can instantaneously understand a course where travelling test is carried out and a remaining distance of the travelling test. If the travelling route 27 of the road where the travelling test is carried out is scrolled with progress of the travelling test, or if the travelling route where the travelling test is completed is shown with its color changed, the driver of the tested vehicle 6 can understand the progress of the travelling test.

Embodiment 2

A chassis dynamometer provided with a driver's aid device of an embodiment 2 of the present invention will be explained below with reference to FIGS. 8-11. In a chassis dynamo 1a of the embodiment 2 of the present invention shown in FIG. 8, the same component as that of the chassis dynamo 1 of the embodiment 1 is shown by the same reference number, and its detailed explanation will be omitted here.

In the chassis dynamo 1a of the embodiment 2, the driver's aid device 5 has a travelling speed pattern creating section or means 52a that creates the travelling speed pattern on the basis of a map data 10. This travelling speed pattern creating section 52a is provided with a travelling simulation function (not shown).

The travelling speed pattern creating section 52a creates the travelling speed pattern on the basis of the map data 10. In this case, an actual vehicle travels on the road where the travelling test is carried out, and by using this travelling data and the map data 10, the travelling speed pattern might be created.

Figure 9:
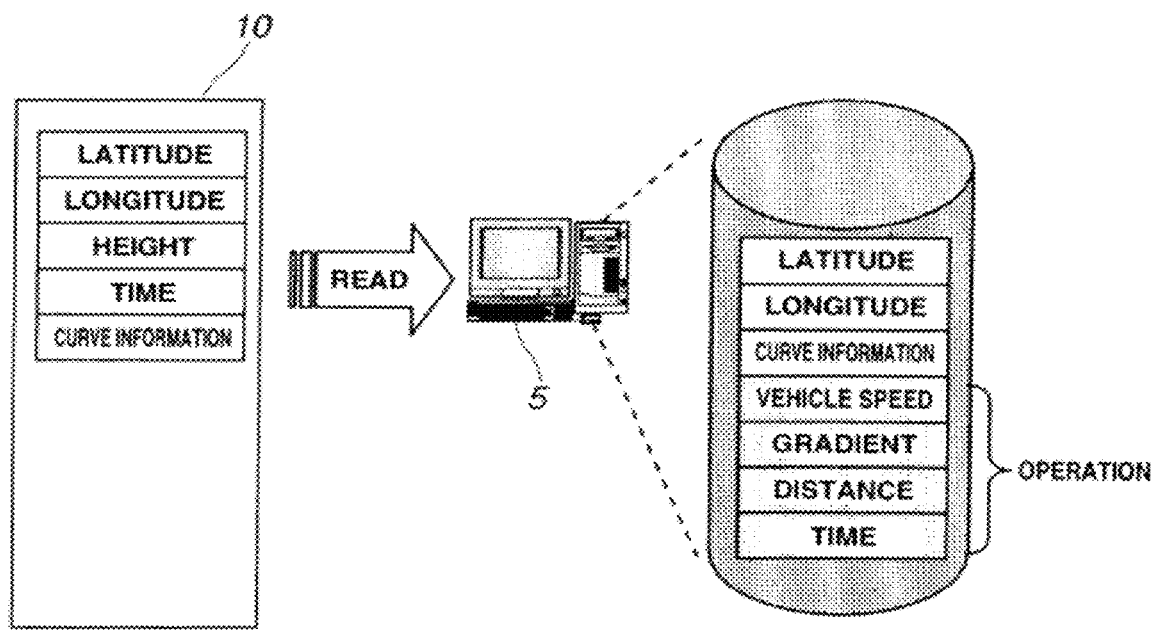
FIG. 9 is a schematic diagram showing input and output data of the driver's aid device according to the second embodiment of the present invention.

That is, according to the driver's aid device of the embodiment 2, as shown in FIG. 9, since the travelling speed pattern creating section 52a creates the travelling speed pattern on the basis of the map data 10, the travelling speed pattern can be obtained without travelling on the road where the travelling test is carried out by the actual vehicle. For example, when creating the travelling speed pattern, by setting, in the travelling simulation function, acceleration and deceleration manners of the tested vehicle also a speed in a curve with a legal limit of the road where the travelling test is carried out being an upper limit, the travelling speed pattern of an arbitrary road on the map can be created. Here, this map data 10 includes at least data for calculating the distance (e.g. the information of the latitude or the longitude) and data for calculating the gradient of the road (e.g. the information of the altitude (or height)). Further, also when travelling on the road where the travelling test is carried out by the actual vehicle equipped with the GPS receiver 8 as shown in the embodiment 1, by adding the information of the map data 10, a more accurate travelling speed pattern can be created and the number of the travels by the actual vehicle can be reduced.

Figure 10:
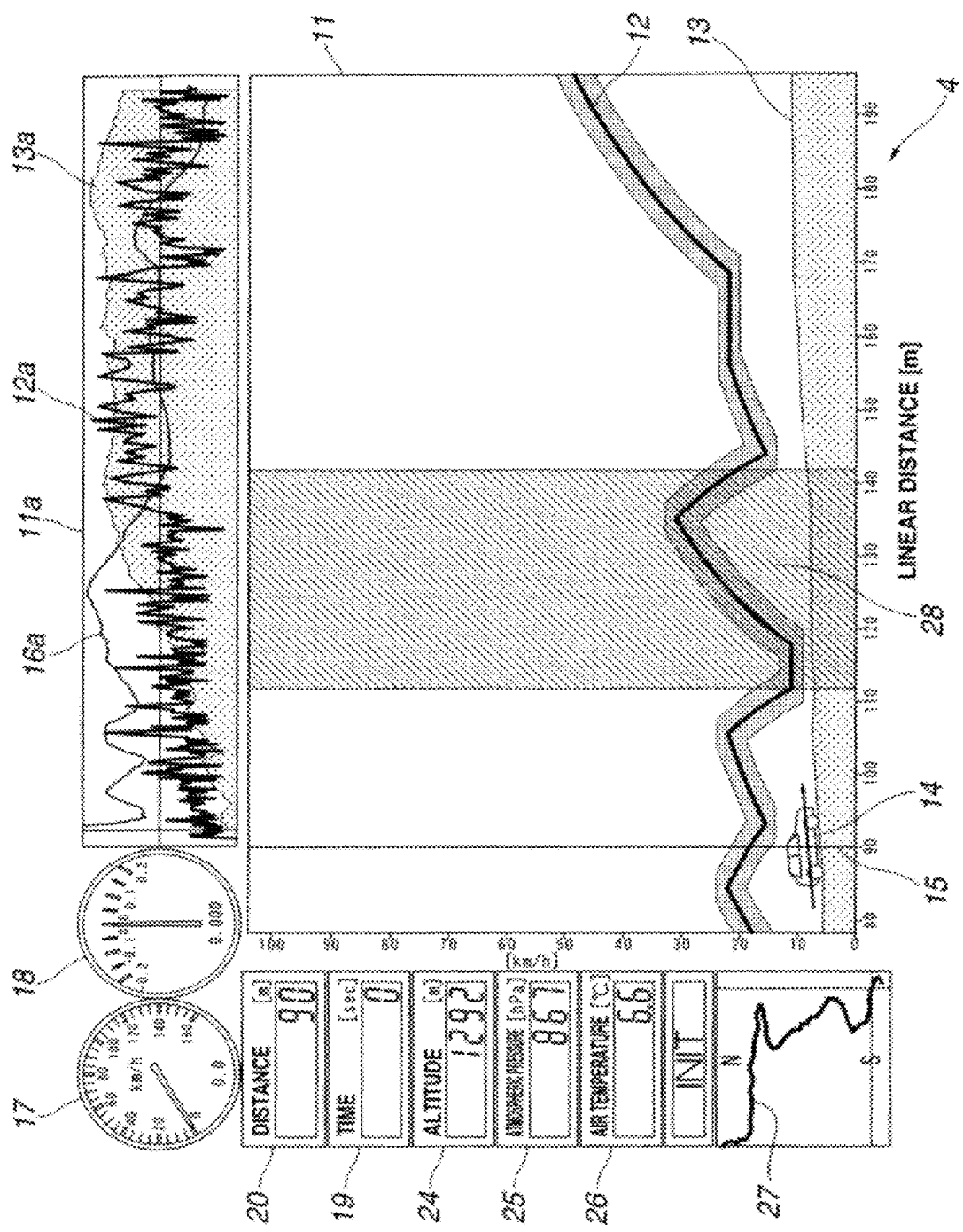
FIG. 10 is a drawing showing an example of a screen controlled by the driver's aid device according to the second embodiment of the present invention.
Figure 11:
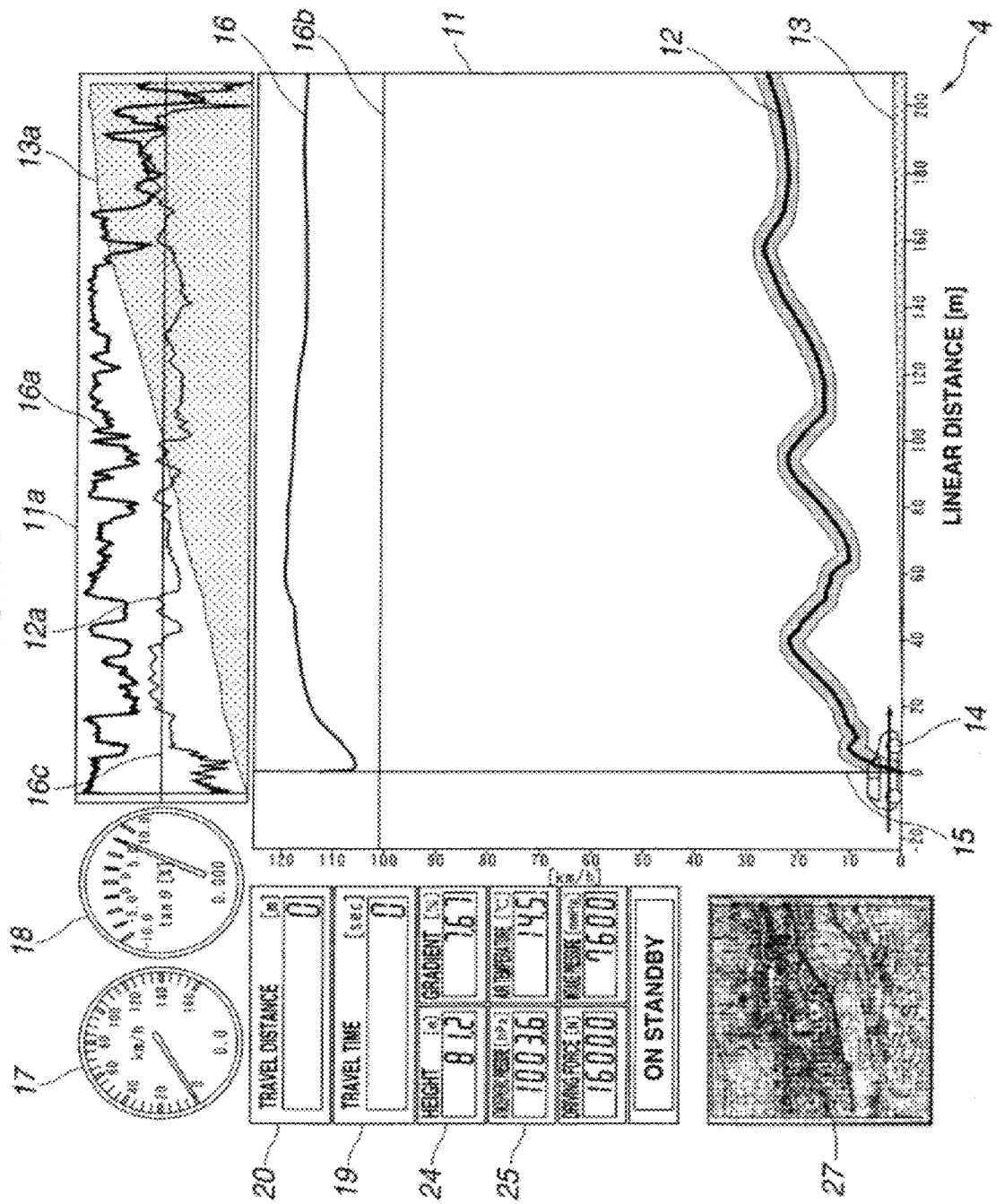
FIG. 11 is a drawing showing an example of a screen controlled by the driver's aid device according to the second embodiment of the present invention.

FIGS. 10 and 11 show examples of the display of the travelling speed pattern on the driver's aid display device 4 in the chassis dynamo 1a of the embodiment 2. Here, the same element or screen as that of the example of the display on the driver's aid display device 4 in the chassis dynamo 1 of the embodiment 1 is shown by the same reference number, and its detailed explanation will be omitted here.

In the example of display of FIG. 10, a curve band 28, as the curve information of the road where the travelling test is carried out, is shown on the main screen 11. The curve band 28 could be shown in a manner that changes a background color of the main screen 11 in accordance with an angle of the curve. For instance, if the curve band 28 is displayed with its color changed according to the angle of the curve so that, if the curve is a tight curve, the color is red color, or if the curve is a gentle curve, the color is green color, the driver of the tested vehicle 6 can recognize and check the detailed curve information while watching and checking the travelling speed pattern 12.

In the example of display of FIG. 10, the entire gradient information 16a of the travelling test is shown on the sub screen 11a. The analog gradient information 18 is also displayed. In addition, altitude information 24, atmospheric pressure information 25, temperature information 26 and the travelling route 27 of the road where the travelling test is carried out, are displayed. The altitude information 24 could be shown on the basis of the map data 10. Here, it could be possible to change the temperature and the atmospheric pressure on the basis of the altitude information 24. With respect to the temperature information 26, it indicates an outside temperature of the vehicle that actually travels on the road where the travelling test is carried out, or a local temperature might be inputted. The temperature information 26 can be appropriately set upon the test travel of the tested vehicle 6.

In the example of display of FIG. 11, the travelling route 27 of the road where the travelling test is carried out is shown, and the map (road information) where the travelling test is carried out is displayed on the travelling route 27. Therefore the driver of the tested vehicle 6 can recognize and check a location where the travelling test is carried out and how much the travelling test progresses. This map is a part of the map data 10 used when creating the travelling speed patterns 12, 12a shown FIG. 5, and includes the gradient information and the curve information. Thus, the gradient information and the curve information of the map data 10 could be synchronized with the topographical feature information 13 and 13a of the main screen 11 and the sub screen 11a and the gradient information 16 and 16a of the main screen 11 and the sub screen 11a. And besides, in the example of display of FIG. 11, a driving force, an intake pressure and the analog gradient information 18 are displayed.

As explained by the above embodiments 1 and 2, according to the driver's aid device of the present invention, the driver of the tested vehicle can recognize and check the curve information and the gradient information of the road where the test is carried out while watching and checking the travelling speed pattern.

Even if a speed command is same, an accelerator operation of the driver of the tested vehicle is different between the upgrade and the downgrade. Thus, the driver of the tested vehicle can easily recognize and check the curve information and the gradient information while watching the travelling speed pattern, thereby achieving the drive along the travelling speed pattern.

Further, by displaying the map of the road where the travelling test is carried out, it is possible to unerringly inform the driver of an overview of the travelling test and the progress state of the travelling test. However, each of the curve information, the gradient information and the map etc. of the driver's aid device could be shown as necessary, or might be shown with some of them combined.

Furthermore, according to the driver's aid device of the present invention, the travelling speed pattern is created on the basis of the map data (that includes the information of the altitude (or height)), thereby creating the travelling speed pattern of the arbitrary road without travelling on the road where the travelling test is carried out by the actual vehicle and collecting the road data. Here, also in the case where the actual vehicle travels on the road where the travelling test is carried out then the travelling speed pattern is created, the travelling data of the actual vehicle can be corrected and compensated by the map data and GPS data. In the case of the conventional manner, in order to collect the data and average them, the actual vehicle travels on the road where the travelling test is carried out a plurality of times. Meanwhile, as for the driver's aid device of the present invention, it is possible to reduce the number of the travels by the travelling data correction and compensation.

For example, the travelling speed pattern is created using an actual measurement data that is obtained by one travel on the road where the travelling test is carried out by the actual vehicle and the map data (or the information obtained by the GPS) that does not change depending on the driver of the actual vehicle, thereby improving the accuracy of the travelling speed pattern. Especially when carrying out an environmental test in highland or in cold district, a work for carrying the vehicle to the highland or the cold district (e.g. Kilimanjaro or South America) that is far way from a city center to create the travelling speed pattern requires time and manpower. Also it takes considerable time and effort to create the travelling speed pattern by a plurality of the test travels in the highland or the cold district. Hence, according to the driver's aid device of the present invention, since the travelling speed pattern can be easily created from the map data, the test of the tested vehicle can be carried out with efficiency.

That is to say, according to the present invention, the driver's aid device can display the information that is necessary for the driver of the tested vehicle to drive while following the travelling speed pattern in the easy-to-understand manner. In addition, when creating the travelling speed pattern of the road where the travelling test is carried out, it is possible to correct, on the basis of the map data and the GPS data, an error which is caused by a difference of the driver who drives the actual vehicle on the road where the travelling test is carried out. The accuracy of the performance evaluation of the vehicle by the chassis dynamometer can therefore be improved. Here, when the horizontal axis of the travelling speed pattern is the travel distance, the travelling test can be replicated, therefore this is preferable. However, like the conventional manner, the travelling speed pattern might be shown by the time.

Embodiment 3

A driver's aid system of an embodiment 3 of the present invention has a first controlling section or means that displays the travelling speed pattern on a first displaying section or means and a second controlling section or means that displays a route (hereinafter called a travelling route) through which the travelling test is carried out and a map data corresponding to this route with these route and map data overlaid on a second displaying section or means, which are provided in a chassis dynamo. According to the driver's aid system of the embodiment 3 of the present invention, a person other than the driver of the tested vehicle can instinctively understand the geographical information of the travelling route and the progress state of the travelling test by the fact that the person watches the travelling route and the map data corresponding to the travelling route which are displayed on the second displaying section.

A chassis dynamometer provided with the driver's aid system of the embodiment 3 of the present invention will be explained below with reference to FIG. 12. However, the driver's aid system of the present invention is not limited to this embodiment. It can be modified to solve problems as necessary, and this modified system is also included in the present invention. For instance, in a case where the performance evaluation test is carried out on the basis of the travelling pattern that represents an existing urban area and an expressway, the travelling route represented by this travelling pattern and the map data corresponding to this travelling route could be displayed. In a chassis dynamo 1b of the embodiment 3 of the present invention shown in FIG. 12, the same component as that of the chassis dynamo 1 of the embodiment 1 is shown by the same reference number.

Figure 12:
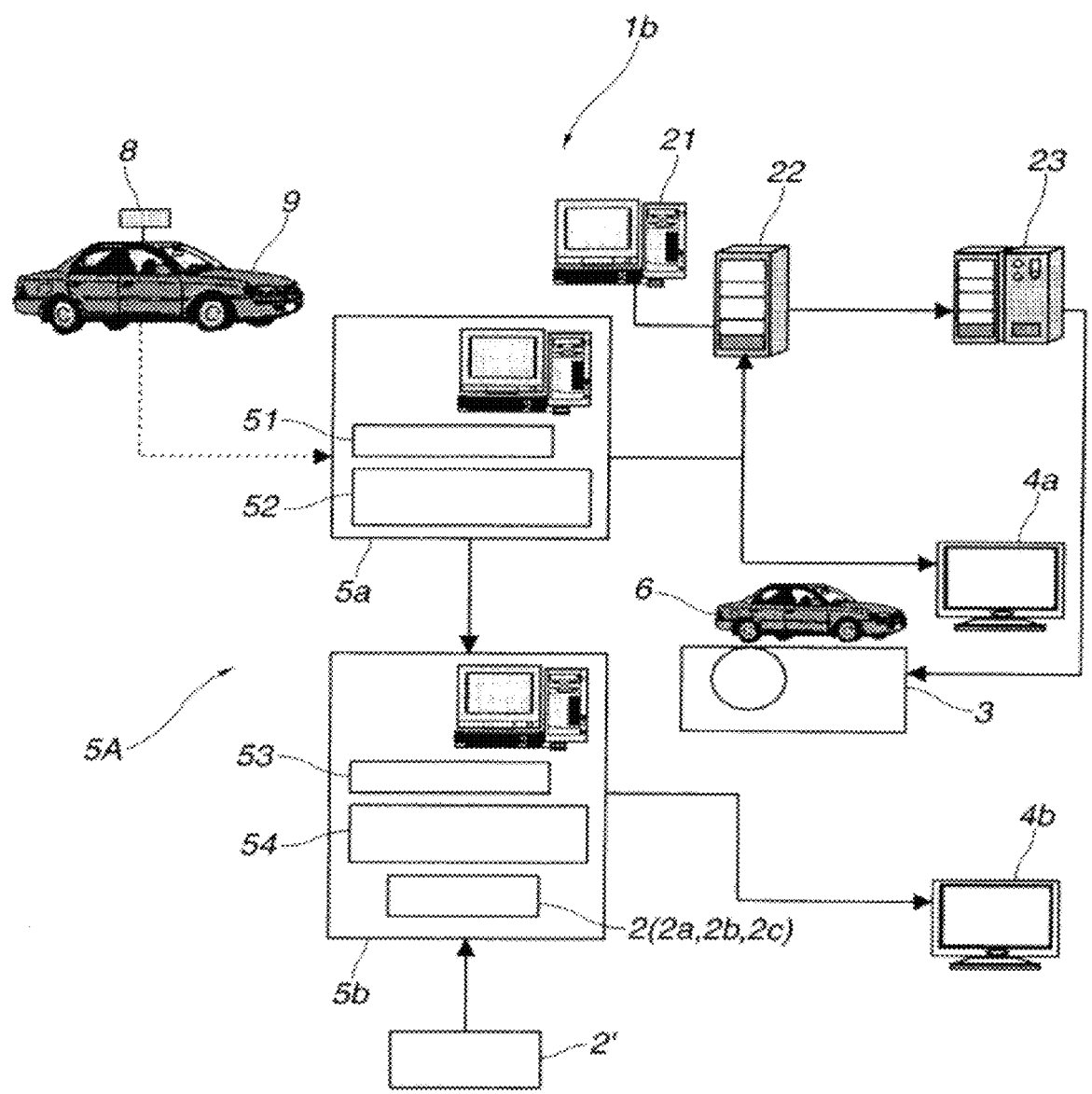
FIG. 12 is a system block diagram of a chassis dynamometer provided with a driver's aid system according to a third embodiment of the present invention.

As shown in FIG. 12, the chassis dynamo 1b of the embodiment 3 of the present invention has the chassis dynamometer 3 on which the driving wheels of the tested vehicle 6 are put and a driver's aid system 5A. The driver's aid system 5A is provided with a driver's aid device 5a that is the first controlling section, a driver's aid auxiliary device 5b that is the second controlling section, a driver's aid display device 4a and an auxiliary display device 4b.

The chassis dynamometer 3 is controlled by the operation measurement board 22 through the dynamo control board 23. The control computer system 21 is the man-machine interface and executes the manual operation, the correction etc. of the operation measurement board 22. Here, the operation measurement board 22 inputs the test schedule information (the speed information, the gradient information) from the driver's aid device 5a and the information (the vehicle speed etc. of the tested vehicle 6) detected by the chassis dynamometer 3.

The driver's aid device 5a has the travelling speed pattern creating section or means 52 and the controlling section or means 51.

The travelling speed pattern creating section 52 creates the travelling speed pattern as shown in FIG. 11 on the basis of a measurement data of the vehicle 9 that actually travelled on the road where the travelling test is carried out. Here, as shown in FIG. 12, the travelling speed pattern creating section 52 creates the travelling speed pattern on the basis of the measurement data collected by the fact that the vehicle 9 actually travelled on the road where the travelling speed test is carried out, and also could add the information of the latitude, the longitude etc. on the basis of the information received by the GPS receiver 8. As a consequence, a more accurate travelling speed test based on the information received by the GPS receiver 8 can be carried out. Further, since the position of the vehicle 9 and the speed information at this position can be obtained from the information obtained by the GPS receiver 8, the travel distance of the vehicle 9 on the road where the travelling test is carried out can be determined from the information received by the GPS receiver 8. Therefore, the travelling speed pattern creating section 52 can easily create the travelling speed pattern whose horizontal axis is the travel distance or the travelling speed pattern whose horizontal axis is the time.

The controlling section 51 shows the travelling speed pattern created by the travelling speed pattern creating section 52 on the driver's aid display device 4a. In addition, the controlling section 51 shows, on the driver's aid display device 4a, the information (the gradient information etc.) that is necessary for the driver of the tested vehicle 6 to drive the tested vehicle 6 while following the travelling speed pattern.

The driver's aid auxiliary device 5b has a controlling section or means 53 and a correcting section or means 54.

The controlling section 53 controls to show the measurement data and the position data (the latitude, the longitude) inputted by the travelling speed pattern creating section 52 and a map data 2 inputted from outside sources with these data overlaid on the auxiliary display device 4b. The map data 2 can be previously stored in the driver's aid auxiliary device 5b. Or the map data 2 might be obtained from map information 2' through the network. When showing the map data 2 on the auxiliary display device 4b, a satellite image, a contour map, an urban area map etc. could be added for particular uses. Here, it is possible to provide a plurality of the auxiliary display devices 4b.

The correcting section 54 corrects displayed positions of the travelling route according to the above position data and the route of the map data 2, which are shown on the auxiliary display device 4b. Although the position data inputted by the travelling speed pattern creating section 52 is the data obtained through the GPS, the position data (the latitude, the longitude) obtained from the GPS is inferior to the information of the latitude and the longitude of the map data 2 in accuracy. Because of this, when the travelling route shown according to the position data obtained from the GPS and the road of the map data 2 corresponding to this travelling route are shown with these travelling route and road overlaid, an error or a gap arises between the displayed positions of this travelling route and the map data 2. Thus the correcting section 54 makes correction to the displayed position of the travelling route or the map data 2 corresponding to this travelling route, thereby showing the map data 2 so that the travelling route and the road of the map data 2 are identical with or match up with each other.

Here, if the driver's aid auxiliary device 5b is provided with an input device (not shown, e.g. a keyboard, a 3D mouse etc.) and the correcting section 54 is configured to scale up/down the map data 2 and the travelling route or to vary a view direction and a view angle on the basis of information from this input device, the third person can select a displaying manner that suits preferences of the person. In this operation, as a center point used when scaling up/down the map data 2 or a center point used when varying the view direction and the view angle, it could be a mouse pointer shown on the auxiliary display device 4b or might be a point that indicates the position of the tested vehicle 6 on the auxiliary display device 4b.

Functions of these controlling sections 51 and 53, travelling speed pattern creating section 52 and correcting section 54 can be realized by a computer and a program. The program is stored in the known storage medium or could be provided through the network. Further, in this embodiment, the driver's aid device 5a and the driver's aid auxiliary device 5b are each formed by a piece of hardware. However, the driver's aid device 5a and the driver's aid auxiliary device 5b could be formed by integrated hardware.

Figure 13:
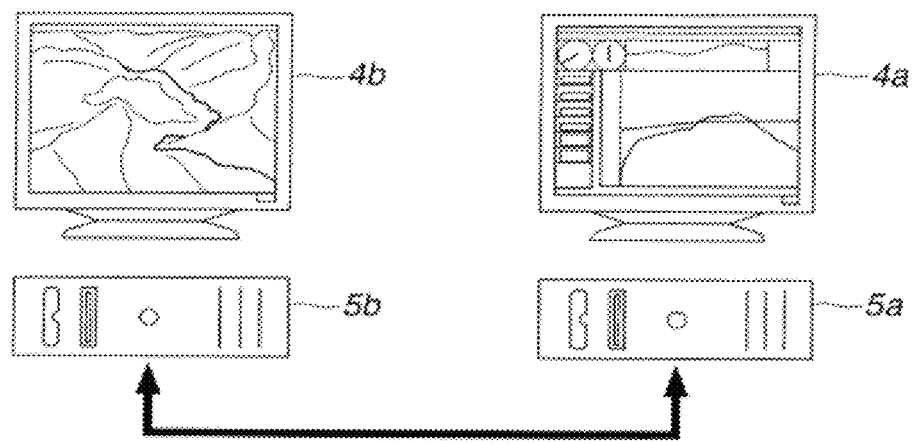
FIG. 13 is a drawing showing an example of a screen controlled by the driver's aid system according to the third embodiment of the present invention.

FIG. 13 shows examples of the display controlled by the driver's aid device 5a and the driver's aid auxiliary device 5b. The driver's aid device 5a and the driver's aid auxiliary device 5b are configured to send/receive the data to/from each other. A connecting manner between the driver's aid device 5a and the driver's aid auxiliary device 5b are not especially limited. However, for instance, they could be connected through LAN connection. As the driver's aid display device 4a and the auxiliary display device 4b, a monitor such as CRT can be used.

The driver's aid display device 4a displays thereon the travelling speed pattern outputted from the driver's aid device 5a. As an example of display of the driver's aid display device 4a, it could be FIGS. 4 and 10 shown in the embodiments 1 and 2 respectively. The driver of the tested vehicle 6 drives the tested vehicle 6 on the chassis dynamometer 3 while checking this travelling speed pattern so that a travelling speed of the tested vehicle 6 follows this travelling speed pattern.

On the other hand, the auxiliary display device 4b displays thereon the travelling route outputted from the driver's aid auxiliary display device 5b and the map data 2 corresponding to this travelling route. When carrying out the travelling test, the driver's aid auxiliary device 5b shows, on the auxiliary display device 4b, the progress state of the travelling test on the basis of a command value of the travelling speed pattern sent in real time from the driver's aid device 5a, in a manner that changes a color of the displayed travelling route. With this display, the third person can instinctively grasp a geographical condition of the travelling route and the progress state of the travelling test.

Figure 14:
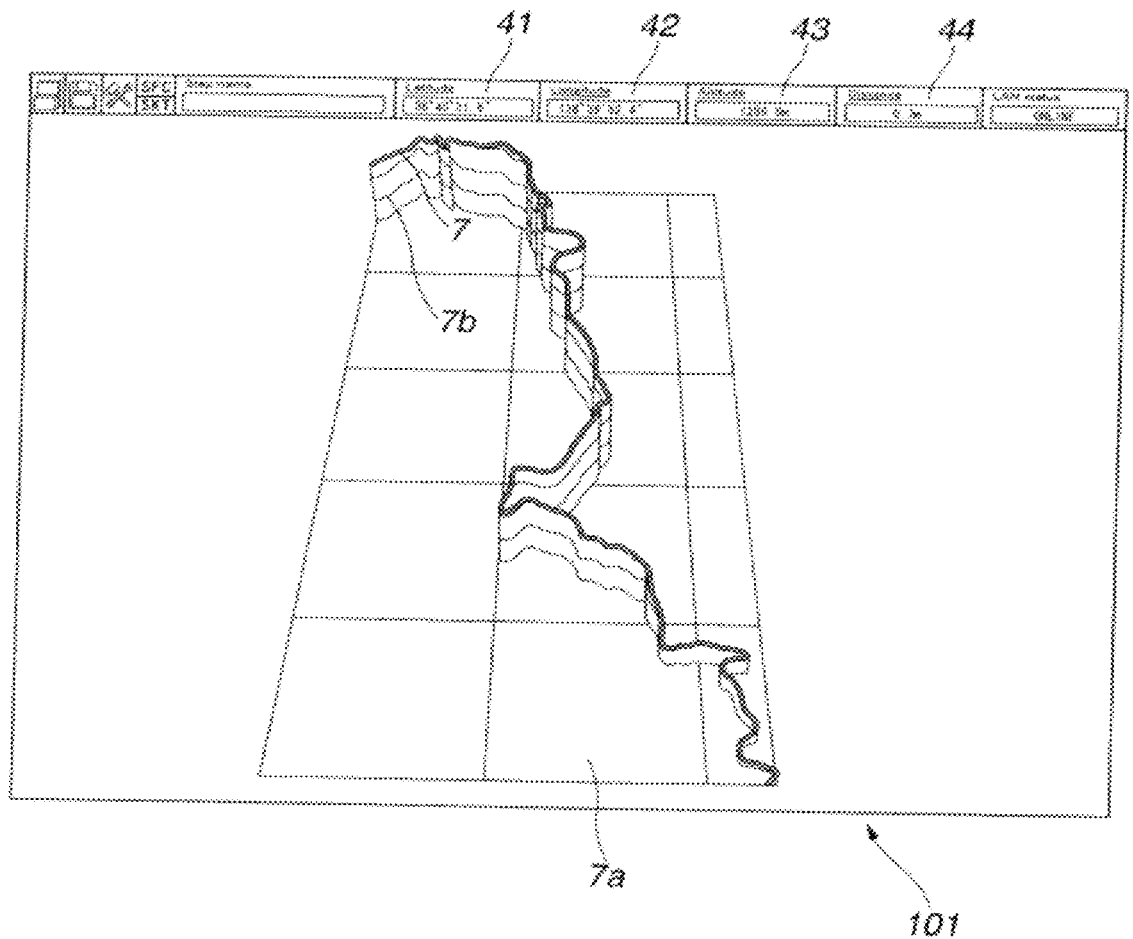
FIG. 14 is a drawing in which a road where a travelling test is carried out is displayed (skeleton display), of the example of the screen controlled by the driver's aid system according to the third embodiment of the present invention.

FIG. 14 is an example in which the controlling section 53 of the driver's aid auxiliary device 5b shows a travelling route 7 on a screen 101 of the auxiliary display device 4b by a 3D skeleton display. That is, the travelling route 7 to which the altitude information (or the height information) is added is displayed on the screen 101 of the auxiliary display device 4b.

Figure 15:
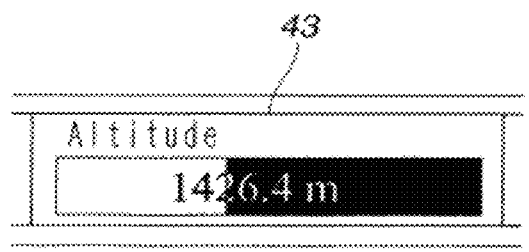
FIG. 15 is an enlarged view of a display part showing altitude information at a present position of a tested vehicle, of the example of the screen controlled by the driver's aid system according to the third embodiment of the present invention.

On this screen 101, in addition to the travelling route 7, a latitude information display part 41, a longitude information display part 42, an altitude (or a height) information display part 43, a travel distance display part 44 etc. could be displayed. The latitude information display part 41 indicates latitude of the present position of the tested vehicle 6. The longitude information display part 42 indicates longitude of the present position of the tested vehicle 6. The altitude information display part 43 indicates altitude of the present position of the tested vehicle 6. The travel distance display part 44 indicates travel distance information of the present position of the tested vehicle 6. Further, as shown in FIG. 15, if a number indication field, indicating a current height, of the altitude information display part 43 is also used as a bar graph then this bar graph shows the proportion of the current height to a reference which is a minimum point or a maximum point of the altitude on the route, it is possible to grasp the current altitude information more instinctively. Likewise, a number indication field of the travel distance display part 44 shown in FIG. 14 could be provided with the same function as the altitude information display part 43.

In the example of display of FIG. 14, a bottom surface 7a indicates a sea level altitude 0 m level, and the travelling route 7 is shown in three dimensions according to the height of the travelling route 7. Additionally, in the three dimensional travelling route 7, an altitude reference line 7b is shown, for example, at every altitude 100 m. However, this is not limited to the indication at every altitude 100 m. For instance, the altitude reference line 7b could be shown at every altitude 25 m. Moreover, also the reference of the bottom surface 7a is not limited to the sea level altitude 0 m level. It could be possible to set the reference to the lowest altitude point on the travelling route 7. In this way, setting of the reference can be changed as necessary.

Figure 16:
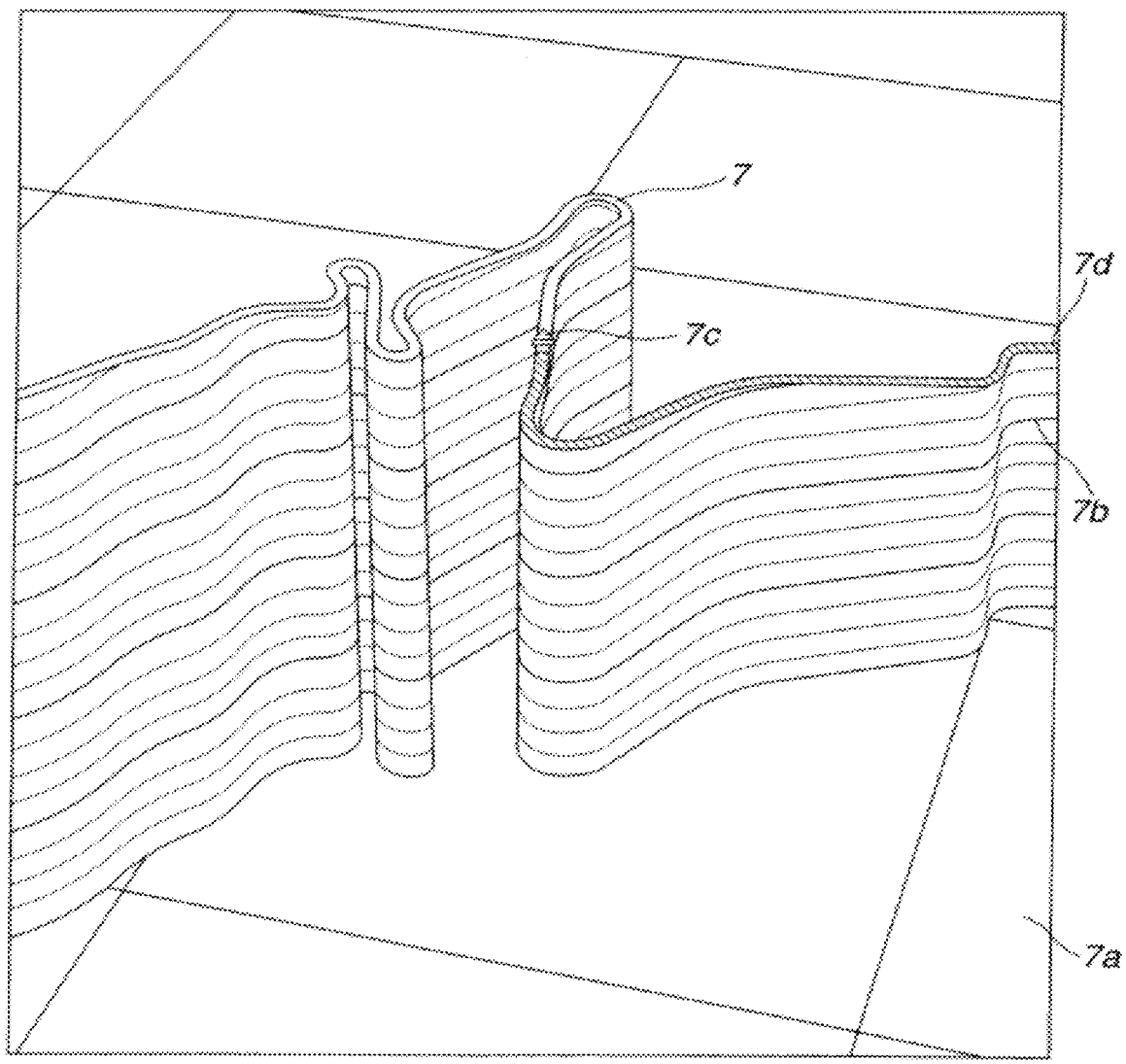
FIG. 16 is an enlarged view of the drawing in which the road where the travelling test is carried out is displayed (the skeleton display), of the example of the screen controlled by the driver's aid system according to the third embodiment of the present invention.

As shown in FIG. 16 that is an enlarged view of FIG. 14, if a route 7d where the travelling test is completed is shown with its color changed on the travelling route 7, it is possible to easily grasp the progress information of the travelling test. In addition, a marker 7c that indicates the present position of the tested vehicle 6 could be shown on the travelling route 7. A shape or a displayed position of the marker 7c can be selected and shown in an easy-to-understand manner as necessary. It is preferable to show the present position of the marker 7c on the basis of the command value of the travelling speed pattern. The reason why this is because, since a speed indication of the travelling speed pattern and the speed of the tested vehicle 6 do not always agree with each other, if the present position of the marker 7c is shown on the basis of the detection speed of the tested vehicle 6, the marker 7c might be shown with its position shifted from the present position on the travelling route 7.

Figure 17:
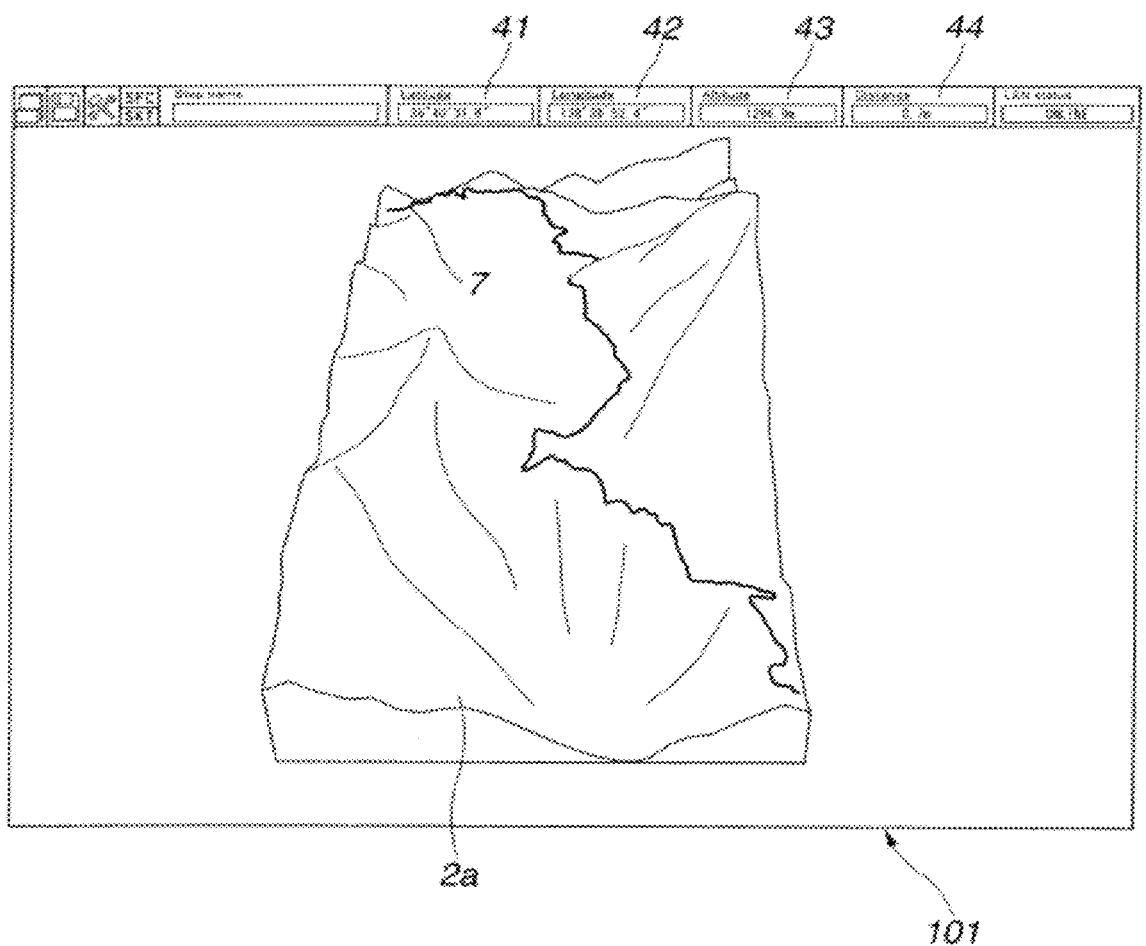
FIG. 17 is a drawing in which the road where the travelling test is carried out is displayed with topographical feature information (surface display), of the example of the screen controlled by the driver's aid system according to the third embodiment of the present invention.

FIG. 17 is an example in which the controlling section 53 of the driver's aid auxiliary device 5b shows, on the screen 101 of the auxiliary display device 4b, a surface display where the travelling route 7 and a map data 2a including the topographical feature information corresponding to this travelling route 7 are displayed. Here, the same element of the display on the screen 101 in FIG. 17 as that in FIG. 14 is shown by the same reference number, and its detailed explanation will be omitted here (as for an example of display of the screen 101 in FIG. 18, it is also the same). As shown in FIG. 17, by displaying the travelling route 7 and the map data 2a with these route and map data overlaid on the screen 101, it is possible to get such realistic feeling that the performance evaluation test of the vehicle is carried out while travelling on the actual road (mountains, plains etc.). Here, if the vehicle 9, shown in FIG. 12, which actually travelled on the road where the travelling test is carried out is provided with a vehicle-mounted camera (not shown) and image captured by this vehicle-mounted camera is displayed on the screen 101, a condition of the road where the travelling test is carried out is further understood. Here, it is preferable that the image from the vehicle-mounted camera is displayed on the basis of the command value of the travelling speed pattern, same as the above progress information of the travelling test.

Figure 18:
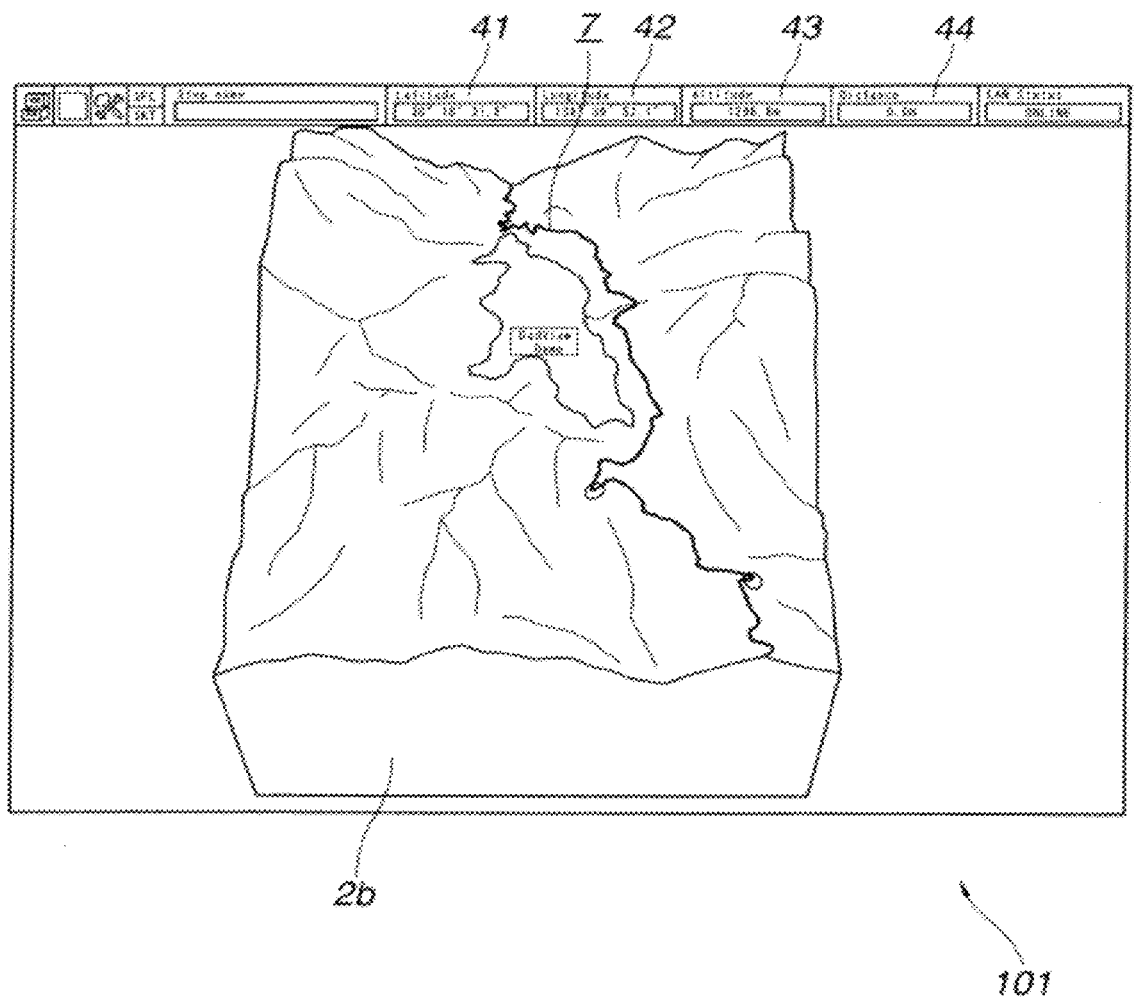
FIG. 18 is a drawing in which the road where the travelling test is carried out is displayed with topographical feature information and map information, of the example of the screen controlled by the driver's aid system according to the third embodiment of the present invention.

FIG. 18 is the example in which the controlling section 53 of the driver's aid auxiliary device 5b shows, on the screen 101 of the auxiliary display device 4b, the travelling route 7 and a map data 2b including 3D map information corresponding to this travelling route 7. In a case where the travelling route 7 and the map data 2b are displayed with these route and map data overlaid as shown in FIG. 18, it is required that the road on the map data 2b and the displayed travelling route 7 should be identical with each other. Thus, by performing matching between latitude and longitude of a selected point on the travelling route 7 and latitude and longitude of the map data 2b, the road on the map data 2b and the travelling route 7 are identical with each other. When displaying the map data 2b, a 2D map data could be displayed. However, if the map data 2b is displayed in 3D, it is possible to provide more detail information as to on what actual road the travelling test is carried out.

Figure 19:
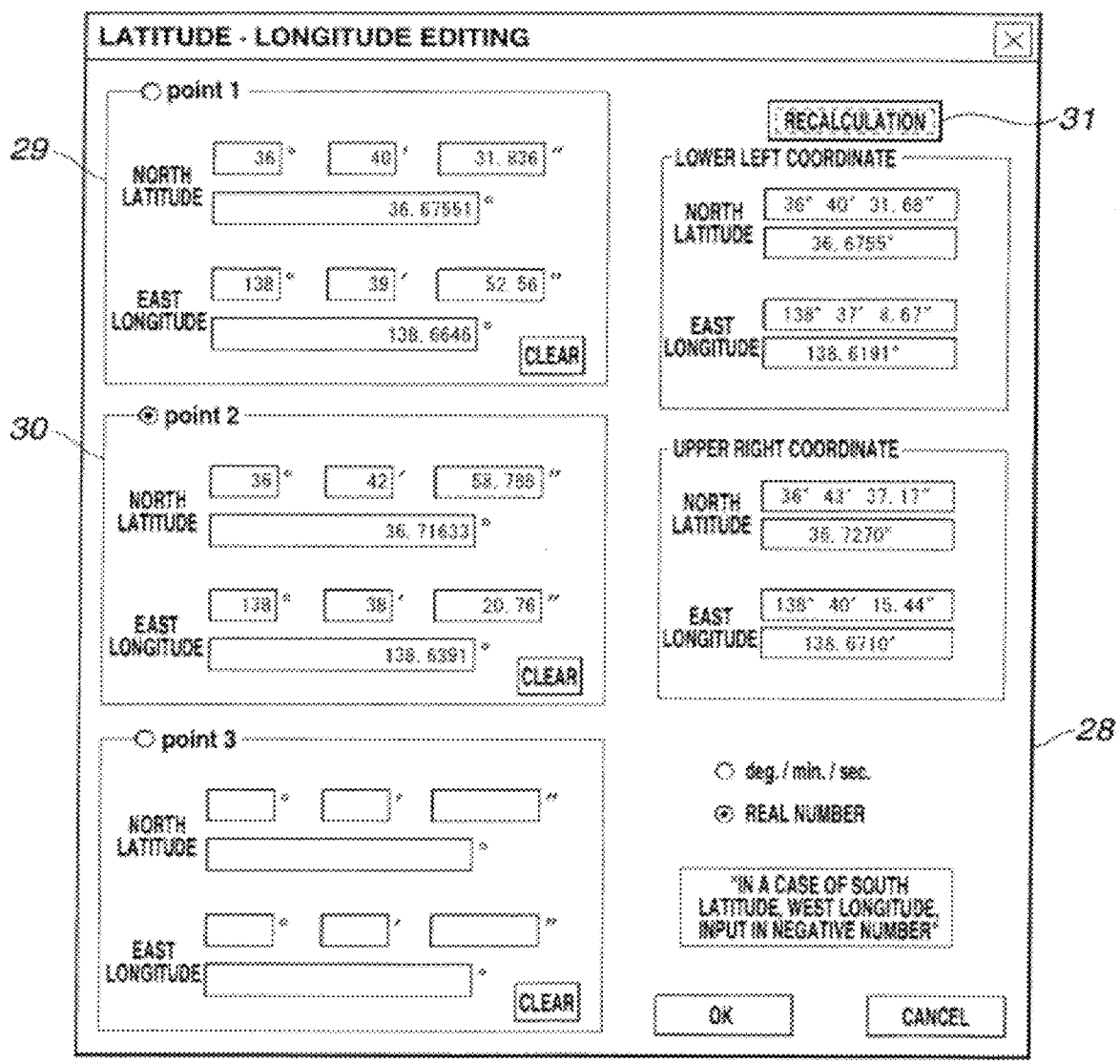
FIG. 19 is a drawing showing an example of a coordinate input screen of the driver's aid system according to the third embodiment of the present invention.

In a graphic interface 28 of the correcting section 54 shown in FIG. 19, as a point 1, a latitude and a longitude of a start point of the travelling test are inputted in each input field in a box 29, and as a point 2, a latitude and a longitude of a finish point of the travelling test are inputted in each input field in a box 30, then a recalculation button 31 is pushed. When the recalculation button 31 is pushed, a lower left coordinate (a north latitude, an east longitude) and an upper right coordinate (a north latitude, an east longitude) of the map data 2b, which are indicated in accordance with the displayed travelling route, are calculated. By displaying the map data 2b so that these lower left coordinate and upper right coordinate agree with a lower left coordinate and an upper right coordinate of the display screen of the auxiliary display device 4b respectively, the travelling route 7 and the road on the map data 2b can be displayed so as to be identical with each other. Here, the point inputted as the "point" is not limited to the start point and the finish point, and it can be set as necessary. Further, the number of the point is two points or more, and if the number of the point is increased, accuracy of the display of the map is improved. Especially when a distance between the two points is small, by inputting a point (a latitude, a longitude) that is away from the two points as a point 3, it is possible to display the map data 2b accurately.

Figure 20:
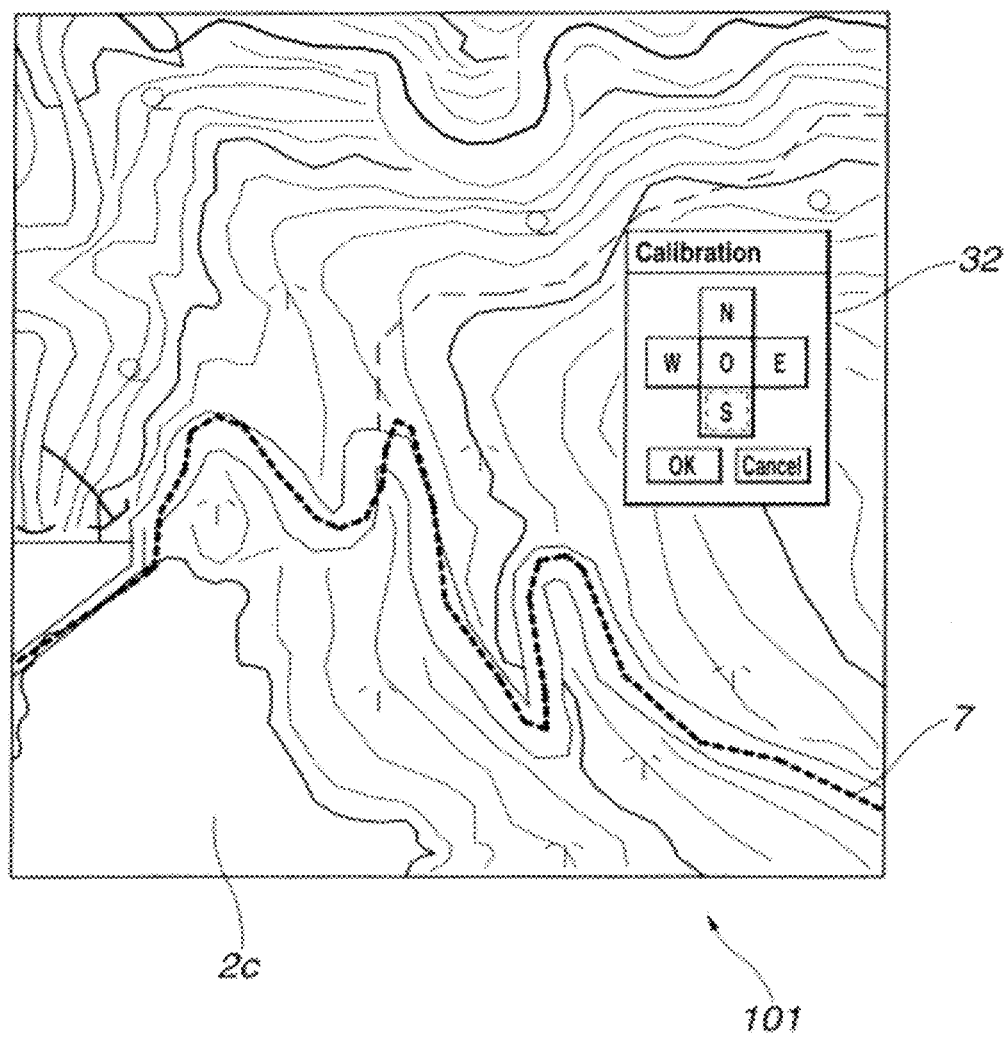
FIG. 20 is a drawing showing an example of an auxiliary input button of the driver's aid system according to the third embodiment of the present invention.

FIG. 20 is the example in which the controlling section 53 of the driver's aid auxiliary device 5b shows, on the screen 101 of the auxiliary display device 4b, the travelling route 7 (shown by a dotted line in the drawing) and a 2D map data 2c corresponding to this travelling route 7. In the example of FIG. 20, the travelling route 7 is shown with the travelling route 7 and the road of the map data 2c matching up with each other. Further, in the example of FIG. 20, as an auxiliary function of the correcting section 54, a correction input button 32 is displayed. For example, in a case where the travelling route 7 and the road of the map data 2c do not match up with each other when visually checked, a displayed position of the travelling route 7 or a displayed position of the map data 2c is shifted parallel on the basis of the input by the correction input button 32, thereby correcting the displayed positions of the travelling route 7 and the map data 2c corresponding to the travelling route 7. Here, the function of the correcting section 54 explained using the example of FIG. 20 is not used for only the case where the travelling route 7 and the map data 2c are displayed on the screen 101. For instance, this function can be used when displaying the map data 2a including the topographical feature information shown in FIG. 17.

As explained above, according to the driver's aid system of the embodiment 3 of the present invention, when carrying out the travelling test of the actual road by the chassis dynamometer, the third person other than the driver who is conducting the travelling test can grasp the overview (the topographical feature information etc.) of the route where the travelling test is carried out and the progress information of the travelling test. It is therefore possible to instinctively get such realistic feeling that the travelling test of the actual road is being carried out, in the performance evaluation test of the vehicle in which the driver drives the tested vehicle so as to follow the travelling speed pattern that replicates the actual road.

Further, since the correcting section or means that corrects the displayed position of the map data corresponding to the travelling route on the basis of a plurality of the points on the travelling route is provided, it is possible to display the travelling route and the map data so that the travelling route and the road of the map data agree with each other. Moreover, since the correcting section or means has the function of parallel shifting the displayed travelling route or the displayed map data, fine adjustment of the displayed positions of the travelling route and the map data can be made.

Here, if the displaying manner of the map data according to the embodiment 3 of the present invention is applied to the display of the map information in the display area of the travelling route 27 in the embodiment 1 or 2, the driver can instinctively get such realistic feeling that the travelling test of the actual road is being carried out.

As explained by the above embodiments 1~3, according to the driver's aid device of the present invention, the accuracy of the performance evaluation of the vehicle by the chassis dynamometer can be improved. In addition, according to the driver's aid system of the present invention, it is possible to visually accurately grasp the geographical information of the route through which the travelling test is carried out and the progress state of the travelling test (and to get the realistic feeling). The driver's aid device and the driver's aid system of the present invention are not limited to the above embodiments, they can be modified, and these modifications are included in the present invention.

For instance, the data used for creating the travelling speed pattern displayed on the driver's aid display device is not limited to the data of the vehicle equipped with the GPS and the map data, and the travelling speed pattern could be created on the basis of data of a sensor of a speed meter etc. installed in the vehicle.

EXPLANATION OF REFERENCE 1, 1a, 1b . . . chassis dynamo
2, 2a, 2b, 2c . . . map data
3 . . . chassis dynamometer
4, 4a . . . driver's aid display device (first displaying section or means)

4b . . . auxiliary display device (second displaying section or means)
5 . . . driver's aid device
5A . . . driver's aid system
5a . . . driver's aid device (first controlling section or means)
5b . . . driver's aid auxiliary device (second controlling section or means)
6 . . . tested vehicle
7 . . . travelling route
10 . . . map data (including 3D information)
11 . . . main screen (area that displays travelling speed pattern)
12, 12a . . . travelling speed pattern
13 . . . topographical feature information (altitude information)
14 . . . marker
15, 15a, 15b . . . reference line
16, 16a . . . gradient information
16b, 16c . . . gradient 0 reference line
27 . . . travelling route
32 . . . correction input button
51, 53 . . . display controlling section or means
52, 52a . . . travelling speed pattern creating section or means
54 . . . correcting section or means
101 . . . screen of auxiliary display device

The invention claimed is:

1. A driver's aid device comprising:
a first displaying section;
a first controlling section that displays, on the first displaying section, a travelling speed pattern that is a driving pattern for performing a performance evaluation test of a tested vehicle by a chassis dynamometer;
a second displaying section; and
a second controlling section that displays, on the second displaying section, a travelling route corresponding to the travelling speed pattern,
wherein the first controlling section shows, in an area of the first displaying section where the travelling speed pattern is displayed, a marker that indicates a current inclination of the tested vehicle along an axis extending from a front to a rear of the tested vehicle with the marker inclined in accordance with gradient information of a road corresponding to the travelling speed pattern, and
wherein the second controlling section displays a completed road portion of the travelling route in a first color and an upcoming road portion of the travelling route in a second color, where the first color and the second color are different colors.

2. The driver's aid device as claimed in claim 1, wherein:
a color of the marker is changed in accordance with an angle of the gradient of the road.

3. The driver's aid device as claimed in claim 2, wherein:
tones of a color of the marker are changed in accordance with an angle of the gradient of the road.

4. The driver's aid device as claimed in claim 1, wherein:
the first controlling section shows the marker at an intersection of a reference line that indicates a position of the tested vehicle shown in the area of the first displaying section where the travelling speed pattern is displayed and the travelling speed pattern.

5. The driver's aid device as claimed in claim 4, wherein:
the first controlling section moves the reference line indicating the position of the tested vehicle in accordance with a vehicle speed of the tested vehicle.

6. The driver's aid device as claimed in claim 1, wherein:
the first controlling section displays, in the area of the first displaying section where the travelling speed pattern is displayed, topographical feature information based on a height of the road corresponding to the travelling speed pattern, and
the first controlling section shows the marker on either one of the travelling speed pattern or the topographical feature information.

7. The driver's aid device as claimed in claim 1, wherein:
the first controlling section displays the travelling speed pattern with a horizontal axis of the travelling speed pattern being a travel distance of the tested vehicle.

8. The driver's aid device as claimed in claim 1, wherein:
the first controlling section displays, in the area of the first displaying section where the travelling speed pattern is displayed, curve information of the road corresponding to the travelling speed pattern, and changes a color of the displayed curve information in accordance with an angle of a curve.

9. The driver's aid device as claimed in claim 1, wherein:
the first controlling section displays, in the area of the first displaying section where the travelling speed pattern is displayed, gradient information of the road corresponding to the travelling speed pattern.

10. The driver's aid device as claimed in claim 1, further comprising:
a travelling speed pattern creating section that creates the travelling speed pattern on a basis of a travelling data obtained by actually travelling on the road corresponding to the travelling speed pattern by a vehicle equipped with a GPS.

11. The driver's aid device as claimed in claim 1, further comprising:
a travelling speed pattern creating section that creates the travelling speed pattern on a basis of a map data having information for calculating a distance and a gradient of the road corresponding to the travelling speed pattern.

12. The driver's aid device as claimed in claim 1, wherein the travelling speed pattern shows a vehicle speed at a particular travel distance for an entire distance travelled, a current distance, and an entire distance to be travelled for the performance evaluation test.

13. The driver's aid device as claimed in claim 1, wherein the travelling speed pattern shows a vehicle speed at a particular travel distance for at least a portion of a distance travelled and a distance to be travelled for the performance evaluation test.

14. A driver's aid system showing a travelling speed pattern which a driver of a tested vehicle follows during a drive, to perform a performance evaluation test of the tested vehicle on a chassis dynamometer, comprising:
a first controlling section that displays the travelling speed pattern on a first displaying section with a vertical axis of the traveling speed pattern indicating a vehicle speed and a horizontal axis of the traveling speed pattern indicating a travel distance; and
a second controlling section that displays a travelling route corresponding to the travelling speed pattern on a second displaying section,
wherein the second controlling section displays a completed road portion of the travelling route in a first color and an upcoming road portion of the travelling route in a second color, where the first color and the second color are different colors.

15. The driver's aid system as claimed in claim 14, wherein:
the second controlling section displays the travelling route to which altitude information is added.

16. The driver's aid system as claimed in claim 14, wherein:
   the second controlling section displays the travelling route and a map data with the travelling route and the map data overlaid.

17. The driver's aid system as claimed in claim 16, wherein:
   the second controlling section has a correcting section that corrects displayed positions of the travelling route and the map data.

18. The driver's aid system as claimed in claim 14, wherein:
   the travelling speed pattern is created on a basis of a travelling data obtained by travelling on a road corresponding to the travelling speed pattern a vehicle equipped with a GPS.

19. The driver's aid system as claimed in claim 18, wherein:
   the second controlling section displays, on the second displaying section, an image of a vehicle-mounted camera mounted on the vehicle equipped with the GPS.

20. The driver's aid system as claimed in claim 14, wherein:
   the second controlling section shows, on a basis of a command value of the travelling speed pattern, a marker that indicates a present position of the tested vehicle on the travelling route.

* * * * *